United States Patent
Swinney et al.

(10) Patent No.: US 10,337,940 B2
(45) Date of Patent: Jul. 2, 2019

(54) COLD CATHODE IONIZATION VACUUM GAUGE WITH MULTIPLE CATHODES

(71) Applicant: MKS Instruments, Inc., Andover, MA (US)

(72) Inventors: Timothy C. Swinney, Fort Collins, CO (US); Clinton L. Percy, Windsor, CO (US); Duane W. Marion, Scottsdale, AZ (US); Brandon J. Kelly, Longmont, CO (US)

(73) Assignee: MKS Instruments, Inc., Andover, MA (US)

( * ) Notice: Subject to any disclaimer, the term of this patent is extended or adjusted under 35 U.S.C. 154(b) by 252 days.

(21) Appl. No.: 15/499,064

(22) Filed: Apr. 27, 2017

(65) Prior Publication Data

US 2017/0315012 A1   Nov. 2, 2017

Related U.S. Application Data

(60) Provisional application No. 62/330,308, filed on May 2, 2016.

(51) Int. Cl.
*G01L 21/34* (2006.01)
*H01J 41/06* (2006.01)
(Continued)

(52) U.S. Cl.
CPC .............. *G01L 21/34* (2013.01); *G01L 21/32* (2013.01); *H01J 41/06* (2013.01); *G01L 21/30* (2013.01)

(58) Field of Classification Search
CPC ......... G01L 21/00; G01L 21/30; G01L 21/32; G01L 21/34; G01L 27/00; G01L 27/007;
(Continued)

(56) References Cited

U.S. PATENT DOCUMENTS 3,611,029 A * 10/1971 Stix .................. H01J 27/02
313/362.1
3,949,260 A * 4/1976 Bayless .................. H01J 3/025
313/157
(Continued)

FOREIGN PATENT DOCUMENTS

WO   WO 2016/115232 A2   7/2016

OTHER PUBLICATIONS

The Gemini product by Inficon: the product Data Sheet, 5 pages (2013).
(Continued)

*Primary Examiner* — Hoai-An D. Nguyen
(74) *Attorney, Agent, or Firm* — Hamilton, Brook, Smith & Reynolds, P.C.

(57) ABSTRACT

A cold cathode ionization gauge includes multiple cathodes providing different spacings between the cathodes and an anode. The multiple cathodes allow for pressure measurements over wider ranges of pressure. A first cathode with a larger spacing may provide current based on Townsend discharge; whereas, a second cathode having a smaller spacing may provide current based on both Townsend discharge at higher pressures and on Paschen's Law discharge at still higher pressures. A feature on the second cathode may support Paschen's Law discharge. Large resistances between the cathodes and a return to power supply enable control of output profiles to extend the pressure ranges with accurate responses and avoid output minima. Pressure measurements may be made based on currents from respective cathodes dependent on the outputs of the cathodes through the wide pressure range of measurement. The multiple cathodes may also provide measurements that avoid the discontinuities found in current outputs of the respective cathodes.

41 Claims, 18 Drawing Sheets

(51) Int. Cl.
*G01L 21/32* (2006.01)
*G01L 21/30* (2006.01)

(58) Field of Classification Search
CPC ...... G01N 27/62; G01N 27/626; G01N 27/64; H01J 41/00; H01J 41/02; H01J 41/04; H01J 41/06; H01J 41/14; H01J 23/027; H01J 23/0275; H01J 23/033; H01J 27/00; H01J 27/02; H01J 27/026; H01J 27/028; H01J 37/04; H01J 37/08; H01J 49/10; H01J 2223/027; H01J 2223/0275; H01J 2223/033; H01J 2237/08; H01J 2237/0822; H01J 2237/0825; H01J 2237/0827
USPC ............... 324/459, 460, 463, 464, 403, 405; 250/261, 397, 423 R; 313/37, 38, 230, 313/293, 310, 364, 567, 631, 632; 315/108, 111.81, 111.91
See application file for complete search history.

(56) References Cited

U.S. PATENT DOCUMENTS

| | | | | |
|---|---|---|---|---|
| 4,295,117 | A | 10/1981 | Lake et al. | |
| 5,006,218 | A * | 4/1991 | Yoshida | C23C 14/351 204/298.06 |
| 5,198,772 | A * | 3/1993 | Peacock | H01J 41/06 250/382 |
| 5,502,354 | A * | 3/1996 | Correa | H01J 17/063 315/111.01 |
| 5,568,053 | A * | 10/1996 | Drubetsky | G01L 21/34 313/157 |
| 6,701,789 | B1 * | 3/2004 | Denny | G01L 21/34 73/700 |
| 7,173,430 | B2 | 2/2007 | Edelmann et al. | |
| 9,927,317 | B2 * | 3/2018 | Hansen | G01L 21/32 |
| 10,094,728 | B2 * | 10/2018 | Yoshida | G01L 21/32 |
| 2006/0012373 | A1 | 1/2006 | Edelmann et al. | |
| 2007/0170926 | A1 * | 7/2007 | Vesel | G01L 21/34 324/460 |
| 2009/0134018 | A1 * | 5/2009 | Watanabe | C23C 14/564 204/298.03 |
| 2015/0091579 | A1 | 4/2015 | Brucker et al. | |

OTHER PUBLICATIONS

Gianchandani, Y.B. et al., "Exploring Microdischarges for Portable Sensing Applications", *Anal. Bioanal. Chem.*, 395:559-575 (2009).
International Search Report, issued in International Application No. PCT/US2016/013219, entitled "Polymer Composite Vacuum Components," dated Nov. 7, 2016.
Written Opinion of the International Searching Authority, issued in International Application No. PCT/US2016/013219, entitled "Polymer Composite Vacuum Components," dated Nov. 7, 2016.
Grant, R. et al., "Active vacuum gauges: application to inverted magnetrons," *Vacuum*, 43(5-7):677-679 (1992).
Redhead, P.A., "Instabilities in Crossed-Field Discharges at Low Pressures," *Vacuum*, 38(8-10):901-906 (1988).
Wilfert, St., et al., "Inverted Magnetron Manometer with Enhanced Operating Time," *Vacuum*, 82:412-419 (2008).
International Search Report and Written Opinion, issued in International Application No. PCT/US2017/029829, filed Apr. 27, 2017, entitled "Cold Cathode Ionization Vacuum Gauge With Multiple Cathodes," dated Aug. 2, 2017.

* cited by examiner

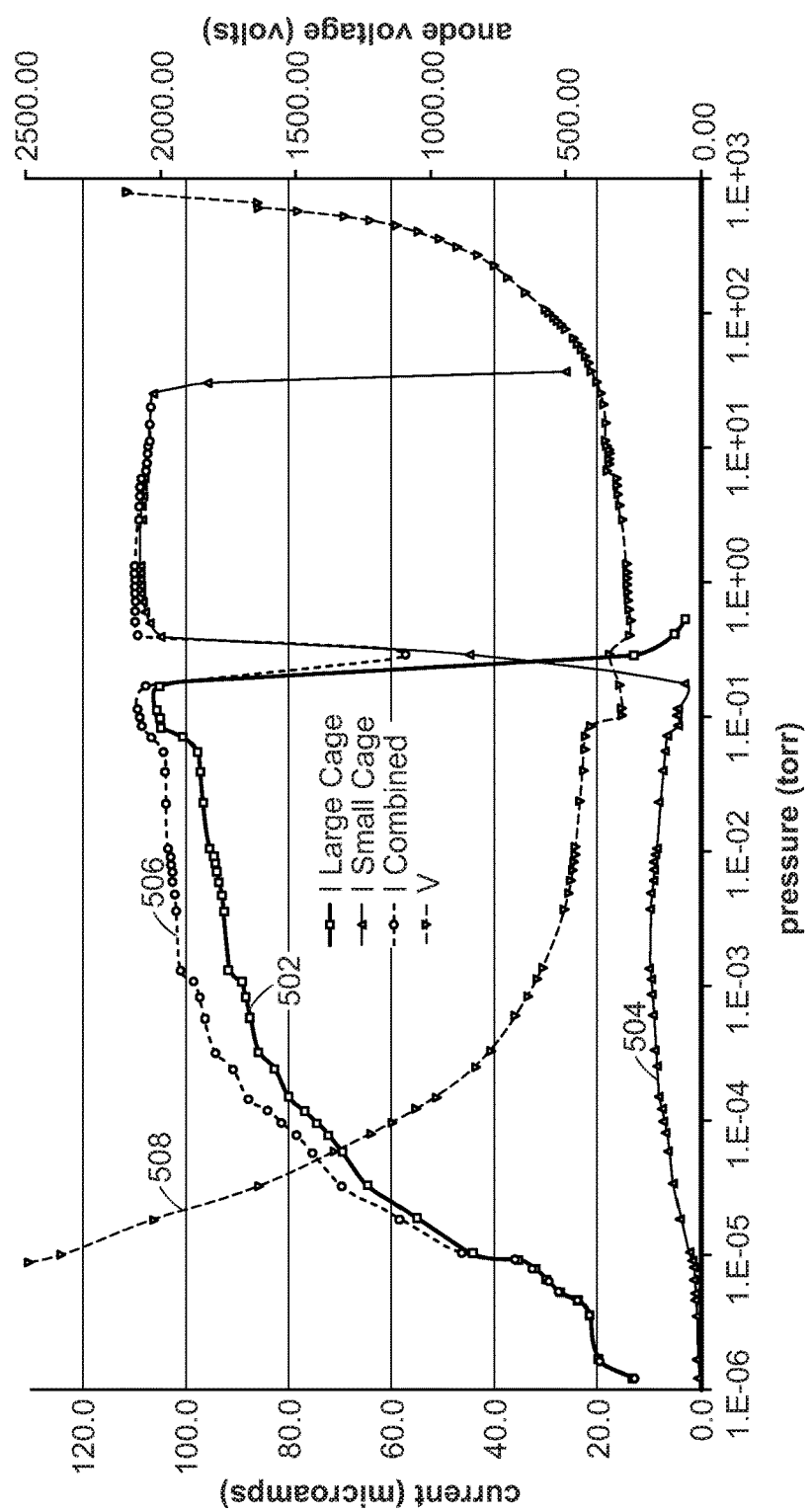

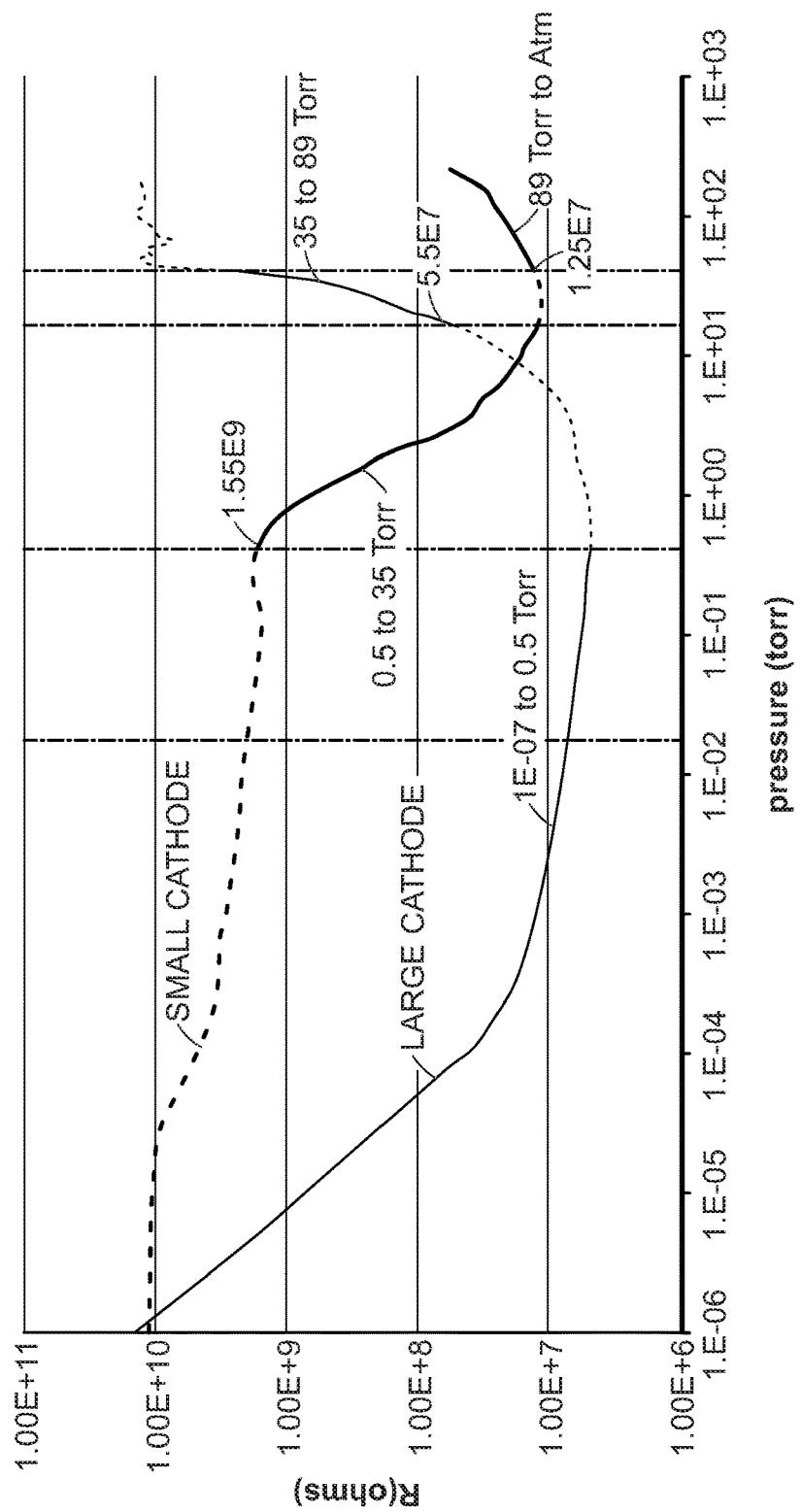

COLD CATHODE IONIZATION VACUUM GAUGE WITH MULTIPLE CATHODES

RELATED APPLICATION(S)

This application claims the benefit of U.S. Provisional Application No. 62/330,308, filed on May 2, 2016. The entire teachings of the above application are incorporated herein by reference.

BACKGROUND

Cold cathode ionization vacuum gauges (CCIGs) are well known. Three commonly known CCIGs include normal (noninverted) magnetron type gauges, inverted magnetron type gauges, and Philips (or Penning) gauges. All of these types of gauges have at least two electrodes (i.e., an anode and a cathode) in an evacuated non-magnetic envelope which is connected to the vacuum to be measured. A high DC voltage potential difference is applied between the anode electrode and the cathode electrode to create an electronic field between the electrodes. A magnetic field is applied along the axis of the electrodes perpendicular to the electric field in order to lengthen free electron paths to sustain a pure electron plasma in which the electrons collide with molecules and atoms to create ions. The ions move to the cathode electrode to maintain the discharge current at a steady state value which is a function of pressure.

A CCIG provides an indirect measurement of vacuum system total pressure by first ionizing gas molecules and atoms inside its vacuum gauge envelope and then measuring the resulting ion current. The measured ion current is directly related to the gas density and gas total pressure inside the gauge envelope, i.e., as the pressure inside the vacuum system decreases, the measured ion current decreases. Gas specific calibration curves provide the ability to calculate total pressures based on ion current measurements.

The CCIG described herein relies on the inverted magnetron principle. The gauge is of cylindrical symmetry. A large voltage potential gradient (i.e., radial electric field) between the anode pin (located at the axis) and the cathode cylindrical envelope provides energy to the electrons for the ionization events to occur. A crossed axial magnetic field provides the long electron trajectory path length required to maintain a pure electron plasma inside the envelope. The discharge current is the measured quantity that is proportional to the pressure in the system.

The discharge is established through an avalanche ionization process that generally starts with a single electron being released into the ionization volume of the gauge. The process responsible for releasing an electron can include a field emission event or a cosmic ray ionization process. The avalanche process relies on the long path length for the electron trajectories that leads to many ionization processes per electron. Each ionization process releases an ion as well as an additional electron that is added into the discharge. As the ions collide with the cathode internal walls, additional electrons are also released into the discharge, thereby contributing to the total charge. As a result of the crossed electric and magnetic fields, a pure electron plasma builds as a sheath around the anode. The electron density is predominantly independent of pressure. Ionization of neutral gas molecules takes place predominantly inside the pressure invariant electron sheath. All ions produced are directed to the cathode by the electric field and with little influence of the magnetic field. The resulting ion current is simply related to the electron density and the total pressure of gas inside the sensor.

The double inverted magnetron design of U.S. patent application Ser. No. 14/500,820, U.S. Publication No. 2015/0091579 to Brucker, et al., shown in FIG. 1A, includes two magnets 115a, 115b held together in a magnet assembly, the two magnets having their magnetic poles opposed to one another. The double inverted magnetron features some of the largest magnetic fields, and as a result provides the largest gauge sensitivities available. Large gauge sensitivities are required to be able to read reliable pressures at ultrahigh vacuum (UHV) levels (i.e., pressures less than about $10^{-9}$ Torr and as low as $10^{-11}$ Torr). U.S. patent application Ser. No. 14/500,820 is incorporated in its entirety by reference.

In CCIGs of the inverted magnetron type, it is possible for a small leakage current to flow directly from the anode 110 to the cathode 120 via the internal surfaces of the gauge, and it is known that the presence of a so-called "guard ring" can collect this leakage current and thereby prevent it from reaching the cathode electrode and being detected by the gauge itself. To perform this function, the guard ring is electrically isolated from the cathode electrode and normally held at a small positive voltage potential difference relative to the cathode electrode.

As shown in FIGS. 1A, 1B, and 1C, a CCIG 100 includes a feedthrough 101 that includes a guard ring connection 102 that provides electrical connection to a guard ring electrode 140 described below. Inside the guard ring connection 102, an anode guard ring insulator 106 provides electrical insulation around an anode connection 110a to an extended anode electrode 110. The guard ring electrode 140 is connected to a starter device 150, which is described below. The guard ring connection 102 is connected by a cathode-guard ring insulator 103 to a weld surface 104, which is seam welded to a monolithic flange assembly 105. As shown in FIGS. 1A and 1B, the monolithic flange assembly 105 includes outer flange 105a and inner flange 105b. The inner flange 105b encloses a cathode electrode 120 surrounding the anode electrode 110 along its length and forming a discharge space 130 between the anode electrode 110 and the cathode electrode 120. A baffle, shown in FIG. 1A as two partitions 170 and 180 having apertures 175 and 185, respectively, is connected to the cathode electrode 120.

As discussed above, a crossed axial magnetic field provides the electron trajectory path length required to maintain a discharge inside the discharge space 130. The magnetic field is created by magnet assembly 115, shown in FIGS. 1A and 1B. The magnet assembly 115 includes a ferromagnetic spacer 114. The magnet assembly 115 can also include an aluminum (or other non-magnetic material) spacer 113 at the end of the magnet assembly closest to the guard ring 140 to adjust the location of the electrical discharge away from the guard ring 140.

The electrically conductive guard ring electrode 140 is interposed between the cathode electrode 120 and the anode electrode 110 about a base of the anode electrode 110 to collect leakage electrical current that would otherwise tend to flow between the anode electrode 110 and the cathode electrode 120 if electrically conductive deposits accumulate over time on surfaces of the cathode-guard ring insulator 103 exposed to the discharge space 130 during operation of the vacuum gauge 100.

A discharge starter device 150 is disposed over and electrically connected with the guard ring electrode 140. As shown in FIG. 1B, the starter device 150 has a plurality of tips 160 (3 tips are shown in the cross-section cylindrically symmetrical view shown in FIG. 1B) directed toward the anode 110 and forming a gap between the tips 160 and the anode 110. The gap between the tips and the anode can be in a range of about 500 µm to about 2500 µm. The gap is configured such that the field emission current during normal operation is in a range of about 1 picoamp (pA) to about 10 pA when a voltage potential difference between the starter device 150 and the anode 110 is established. The field emission current amplitude is dependent on several parameters, such as the voltage potential difference, the size of the gap, the number of points on the starter device, and the type of material that the starter device is made of The voltage potential difference between the starter device and the anode, during operation of the CCIG, can be in a range of about 0.4 kilovolt (kV) to about 6 kV, for example, approximately 3.5 kV. This voltage potential difference produces electrons by field emission from the sharp tips 160 to the anode, thereby seeding some electrons into the discharge volume 130 to trigger the avalanche process that is responsible for building up the discharge. Optionally, the voltage potential difference between the starter device and the anode can be configured to be increased from about 3.5 kV to about 5 kV during startup of the gauge, in order to increase the field emission current by increasing the high voltage supply bias to the anode electrode momentarily, until a discharge is detected by a sudden increase in the discharge current.

As shown in the electronic controller of FIG. 1C, a limiting resistor 410 is placed between the anode electrode 110 and the high voltage power supply 430 (HVPS). The role of the limiting resistor 410 is to put an upper limit to the amount of discharge current that can flow through the discharge volume 130 and to extend the lifetime of the vacuum gauge. As a result of the limiting resistor 410, the actual high voltage bias present at the anode electrode 110 and measured by voltmeter 420 is generally smaller than the voltage delivered by the HVPS 430. In fact, the anode voltage decreases as the ion current increases with pressure, even though the output of the HVPS 430 remains constant at all pressures. In the vacuum gauge described herein, a 25 Megaohm (MΩ) limiting resistor 410 was selected to provide several advantages: 1. a safety limit to the amount of current the HVPS can deliver to an individual in case of accidental contact with internal HVPS components, 2. the choice of resistor moves pressure curve discontinuities into the higher pressure range above $1 \times 10^{-6}$ Torr, and 3. an upper limit for the discharge current of 125 µA when the anode voltage is set to 3.5 kV. The processor 490 of the CCIG controller ensures that the output of the HVPS 430 is constant over the entire pressure range while the processor continuously measures the anode voltage V with voltmeter 420 and discharge current $I_D$ with ammeter 460 to calculate discharge impedance Z as a function of pressure. The processor also measures guard ring current with a meter 470 to monitor current leakage. With this circuit configuration, two independent current loops assure that leakage currents at the anode feedthrough do not cause any inaccuracies in the pressure measurement that depends on discharge current impedance measurements.

CCIGs are typically limited to operation in low pressure ranges below $10^{-2}$ Torr. To measure pressure over ranges that extend as high as atmospheric pressure (760 Torr), they may be combined with pressure gauges using different technologies, such as thermal conductivity or diaphragm gauges.

SUMMARY OF THE INVENTION

In accordance with the present invention, a CCIG is provided with a second cathode and pressure is determined based on measured current flow to each of the cathodes. With different dimensions and electrical connections, different electric potential gradients are obtained between the common anode and the independent cathodes.

As in conventional CCIGs, a magnet applies a magnetic field through at least a first spacing between the anode and the first cathode to lengthen free electron paths and thus sustain a plasma between the anode and the first cathode and a resultant ion current flow into the first cathode. Such electric discharge is known as a Townsend discharge. The measured current from the cathode typically allows for pressure measurement at low pressures such as below $10^{-2}$ Torr to pressures as low as $10^{11}$ Torr.

A second cathode electrically isolated from the first cathode and spaced from the anode by a second spacing less than the first spacing enables electric discharge and pressure measurement at pressures higher than the low pressures required for plasma formation in the first spacing. An electric controller applies voltage between the anode and each of the first and second cathodes to create ionization with plasma discharge at least between the anode and the first cathode at the low pressures and electric discharge between the anode and the second cathode at pressures higher than the low pressures. The electric discharge between the anode and the second cathode may also include a Townsend discharge similar to that of the first cathode, but at higher pressures. It may alternatively, and preferably additionally, allow for a Paschen's Law discharge with breakdown between the anode and the cathode. The controller determines pressure based on both measured current flow to the first cathode and on measured current flow to the second cathode.

The controller may additionally measure anode voltage, compute impedances between the anode and each of the cathodes, and determine pressure based on those impedances.

In disclosed embodiments, each cathode surrounds the anode and is cylindrical, the different spacings being determined by respective radii of cylindrical cathodes. A taper may be provided, for example, at the opening of the second cathode to vary the electric field. In disclosed embodiments, only two cylindrical cathodes are provided, but additional cathodes providing additional spacings for additional measurements may be provided.

In a typical ionization gauge, the cathode provides a spacing from the anode of about 10 millimeters (mm) along a length of about 25 mm, and similar dimensions are appropriate for the first cathode. Based on standard design, the spacing between the anode and cathode, and thus the first spacing in disclosed embodiments, is in a range of 5 to 15 mm, and the first cathode has an effective length inside the magnet in a range of 15 to 40 mm along the anode. The smaller spacing between the anode and the second cathode should generally be in the range of 1.0 to 5.0 mm, such as 2.4 mm, in order to sustain the ion generating plasma at higher pressures. The second cathode should have a length of at least about 6.0 mm in order to sustain the Townsend discharge. To prevent an oversized gauge the second cathode length should be less than 24 mm along the anode. In the disclosed embodiment, the second cathode is about 16 mm long.

The first and second cathodes may be set in a polymer housing that electrically isolates the cathodes from each other and from ground.

To measure even higher pressures than can be measured from the Townsend discharge in the second, smaller cathode extending along the anode, a feature may be provided on the second cathode, directed toward the anode, in order to establish a narrower gap between the anode and the cathode at the feature. That feature allows for electric discharge with breakdown in accordance with Paschen's Law at high pressures approaching atmospheric pressure. The appropriate gap between the anode and feature is in the range of 0.3 to 1.0 mm, with a preferred gap being about 0.6 mm with an anode voltage of about 3 kV. The optimal gap is voltage dependent, and the anode voltages of standard CCIGs range from about 2 kV to 6 kV. With higher voltages, a gap at the higher-end of the preferred range would likely be used. For the cathode operating with Paschen's Law electric discharge, the gap at any particular voltage determines the slope of the current response with pressure. Where the gap is large, the current response is very limited in pressure range or the arc discharge will breakdown to preclude pressure measurement; where the gap is small, the current and impedance response has a lower slope magnitude, the sensitivity goes down and the measurement error will increase.

The Paschen's Law discharge feature may be a disc with a hole within the disc to form the gap. Alternatively, the feature may be a disc with one or more points extending from the disc toward the anode. The feature may be one or more pins extending inwardly from the cathode cylinder. In one embodiment, the feature is a threaded pin, which is inserted from the exterior of the cathode and allows adjustment of the gap between the anode and a bottom end of the pin. The feature may also be on the anode directed toward the cathode.

Large resistances of around 500 kiloohms (kΩ), between each cathode and a return to the power supply that supplies voltage to the anode, reduces fluctuations (random noise and oscillations) in the output response. Further noise reduction is obtained with impedances of at least a megaohm (MΩ) between the cathode and the power supply return. To improve the slope of the current and impedance response, avoiding both steep responses and flat responses, the impedance coupled to the second cathode is at least an order of magnitude larger than that coupled to the first cathode. In one embodiment, resistance of over 1.5 MΩ is coupled to the first cathode and resistance of over 30 MΩ is coupled to the second cathode. At least one of the impedances, particularly the second cathode impedance, may be provided by a variable resistance.

As noted, rather than relying only on the cathode currents, anode voltage may also be used to compute impedance measurements. Different algorithms may be selected to provide a pressure output. The algorithm may be selected based on the impedance measurements, and the algorithms may have impedance measurements as their inputs. The algorithms may be processed using precomputed data stored in lookup tables.

Pressure may be determined based on electrical outputs from each of the first and second cathodes over distinct ranges of pressure, including nonadjacent ranges of pressure in which the pressure is determined based on the first cathode output. For example, pressure may be based on an output of the first cathode for a first low-pressure range, based on an output of the second cathode over a second pressure range higher than the first pressure range, based on an output of the first cathode over a third pressure range higher than the first and second pressure ranges, and based on an output of the second cathode over a fourth pressure range higher than the first, second and third pressure ranges.

In a preferred operation over an extended pressure range, at least a Townsend plasma discharge is supported between the anode and the first cathode at low pressures, at least a Townsend discharge or a Paschen's Law breakdown discharge is supported between the anode and the second cathode at pressures higher than the low pressures. The breakdown discharge may be supported at a feature of the second cathode.

In a method of measuring pressure, a magnetic field is applied to a first space between an anode and a first cathode. At low pressures, electrons are released into the first space to create a Townsend plasma discharge in the first space and ion flow to the first cathode. At pressures higher than the low pressures, electric discharge is created between a second cathode and anode to create a current flow to the second cathode. Pressure is based on measured current flow to the first cathode and measured current flow to the second cathode. The electric discharge between the second cathode and the anode may be a Townsend plasma discharge or a Paschen's Law breakdown discharge, or it may include each of those discharges over different ranges of pressure.

In an alternative method of measuring pressure, electrons are released into the first space to create a plasma discharge in the first space and ion flow to the first cathode, a current flow response with respect to pressure of the first cathode having a first discontinuity. Electrons are released into the second space to create a plasma discharge in the second space and ion flow to the second cathode, a current flow response with respect to pressure of the second cathode having a second discontinuity. Pressure is determined based on measured current flow to the first cathode and on measured current flow to the second cathode. Pressure is based on measured current flow to the first cathode through pressures that include the second discontinuity and is based on measured current flow to the second cathode through pressures that include the first discontinuity.

BRIEF DESCRIPTION OF THE DRAWINGS

FIG. 5 illustrates current and voltage outputs of the gauge of FIG. 4.

FIG. 9B illustrates a plot used in the algorithm for determining pressure.

DETAILED DESCRIPTION OF THE INVENTION

A description of example embodiments of the invention follows. The teachings of all patents, published applications and references cited herein are incorporated by reference in their entirety.

It has been determined that the gauge shown in U.S. Patent Application 2015/0091579 can be modified with an electronic controller that operates the gauge at higher pressures as high as 1 Torr or even atmosphere of 760 Torr by maintaining the high voltage on the anode at those higher pressures and modifying the detector electronics, specifically, the processor 490, to rely not just on the cathode current but also on current through the guard ring.

Figure 2:
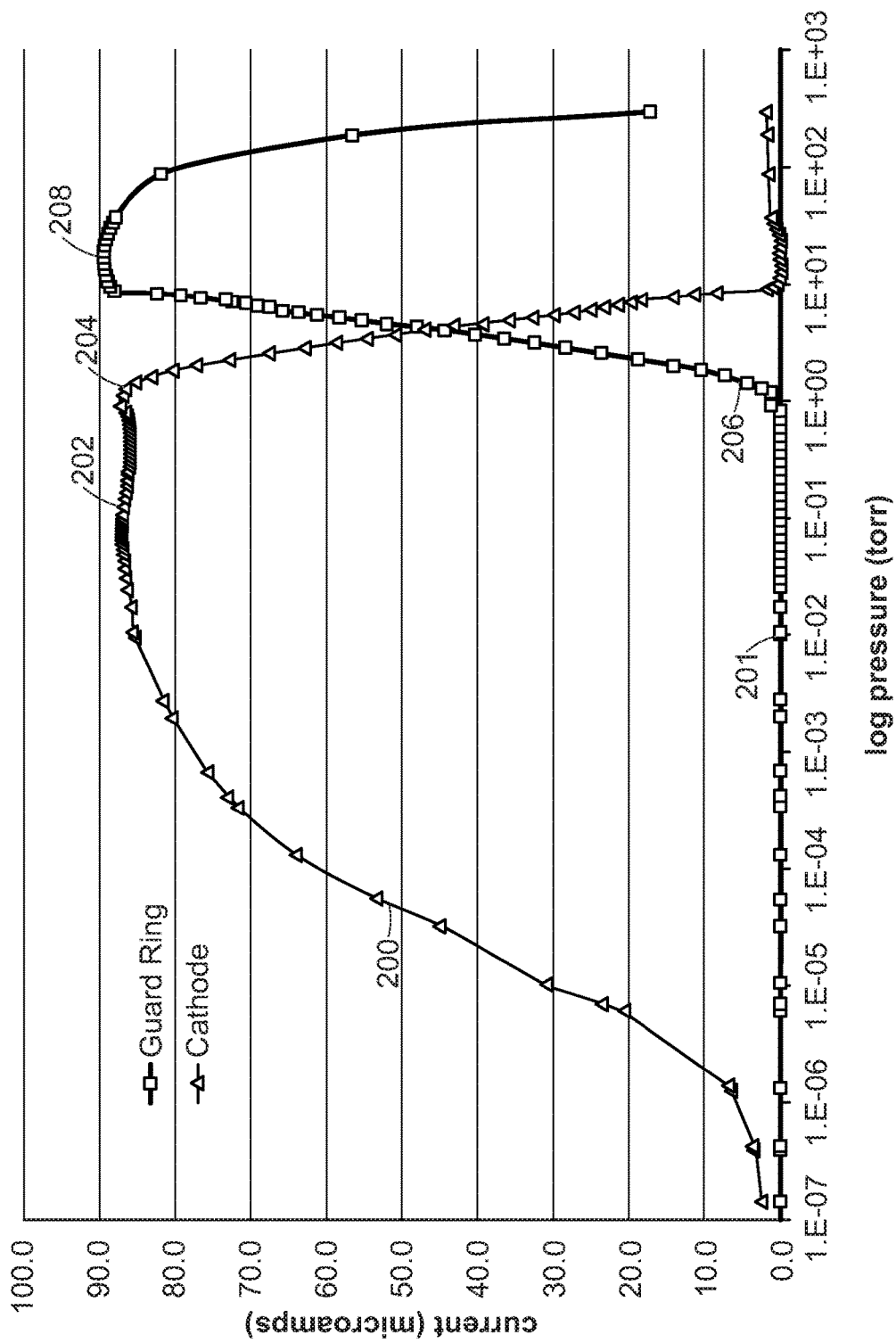
FIG. 2 illustrates current outputs from the cathode and the guard ring when the gauge of FIGS. 1A-C is modified in accordance with the present invention

FIG. 2 shows cathode current in such a design as well as the current of the guard ring, which now functions as a second cathode. In the usual operation of the gauge, pressure is determined from the curve 200, and the anode voltage would be turned off at pressures higher than about $10^{-2}$ Torr at 201. Above that pressure, the current output 202 flattens to become less reliable, and at about 1 Torr, drops rapidly 204. The guard ring current is very low and has only been used to monitor leakage current. However, if the operation of the gauge is maintained at higher pressures as illustrated in FIG. 2, the guard ring current can be seen to rise at 206 as the cathode current falls. Thus, at higher pressures, the guard ring current can be used as the indicator of pressure. It can be seen that at about 10 Torr, the guard ring current begins to fall at 208. Looking at only the guard ring current over 1 Torr through $1\times10^3$ Torr would result in ambiguity. For example, would current of 80 microamp ($\mu$A) indicate 8 Torr or over 100 Torr. However, by also monitoring the cathode current, even at those high pressures, one will know the side of peak at which the guard ring current is flowing.

Because the gauge of the cited patent application was not designed for high-pressure operation, it still lacks accuracy in the flat region of between $10^{-2}$ and 1 Torr and presents difficulties in monitoring guard ring current at the peak guard ring current, but it does present the opportunity for measuring pressure over a much wider pressure range without the need for an additional gauge such as a resistance or diaphragm gauge. It is likely that the Townsend discharge of the primary cathode transitions to the region of the guard ring just below the starter for the increased current in the guard ring. After the guard ring current peak, Paschen's Law breakdown likely occurs at the starter tips 160 where the gap to the anode is much shorter (at 0.676 mm).

Figure 3:
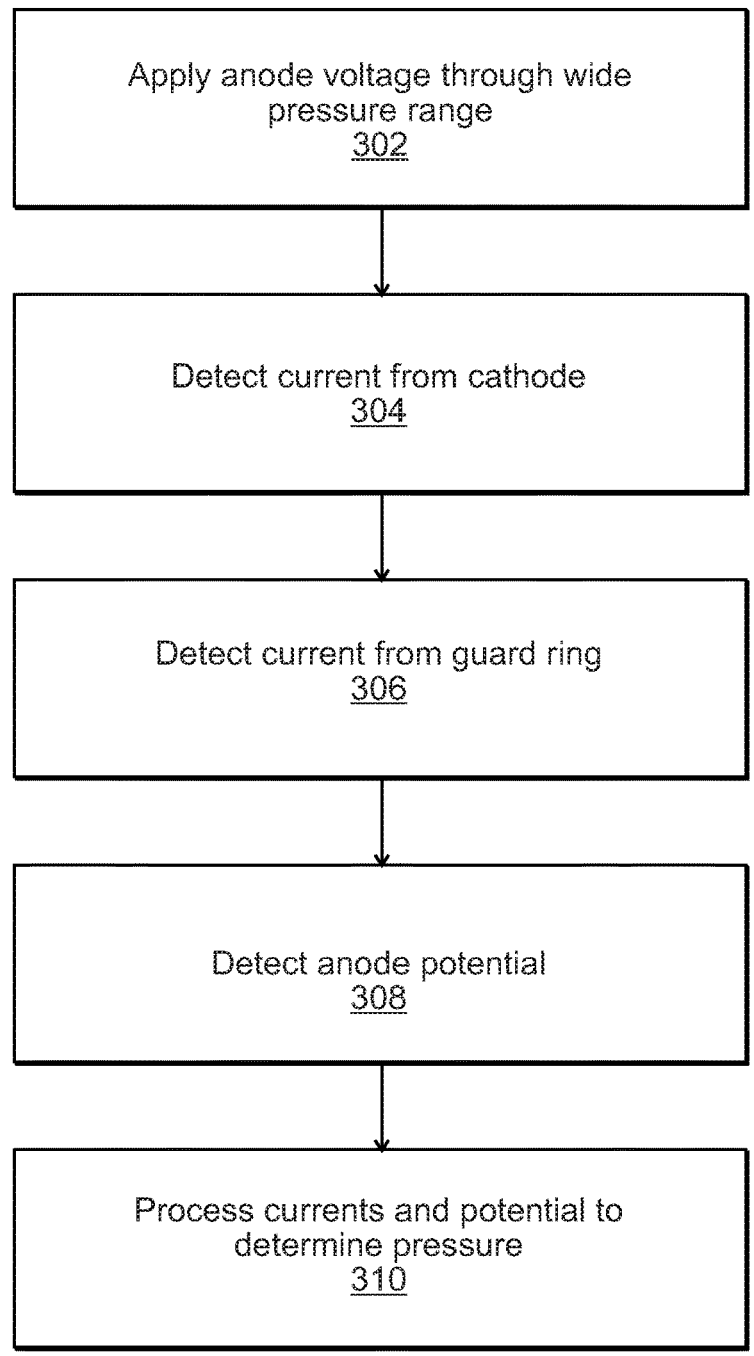
FIG. 3 illustrates modified control of the gauge of FIG. 1A.

Operation of the above described gauge over the wide pressure range can be as illustrated in FIG. 3. Unlike the prior gauge, high voltage is applied at 302 to the anode through a wide pressure range including pressures above $10^{-2}$ Torr and preferably above 1 Torr or even as high as atmosphere. Current from the cathode is detected at 304 and current from the guard ring is detected at 306. Optionally, the anode potential may also be detected at 308. At 310, the current from the cathode, current from the guard ring and potentially the anode potential are processed to determine pressure. Previously current from the guard ring was only used to monitor leakage current. As the above description indicates, the processing is not simply a conversion from current, such as cathode current, to pressure. Rather, multiple currents must be monitored and decisions as to which current to use to provide pressure based on those currents is required. The rising guard ring current can indicate that the cathode current is to the right of the elbow at 204 to distinguish high-pressure measurements from the low pressure measurements. Alternatively, the guard ring current itself can be used to provide the pressure measurement above the elbow 206. Although only currents are shown, anode voltage may be used, or impedances may be calculated using the anode voltage and currents, and the impedance may be used to indicate pressure.

Figure 4:
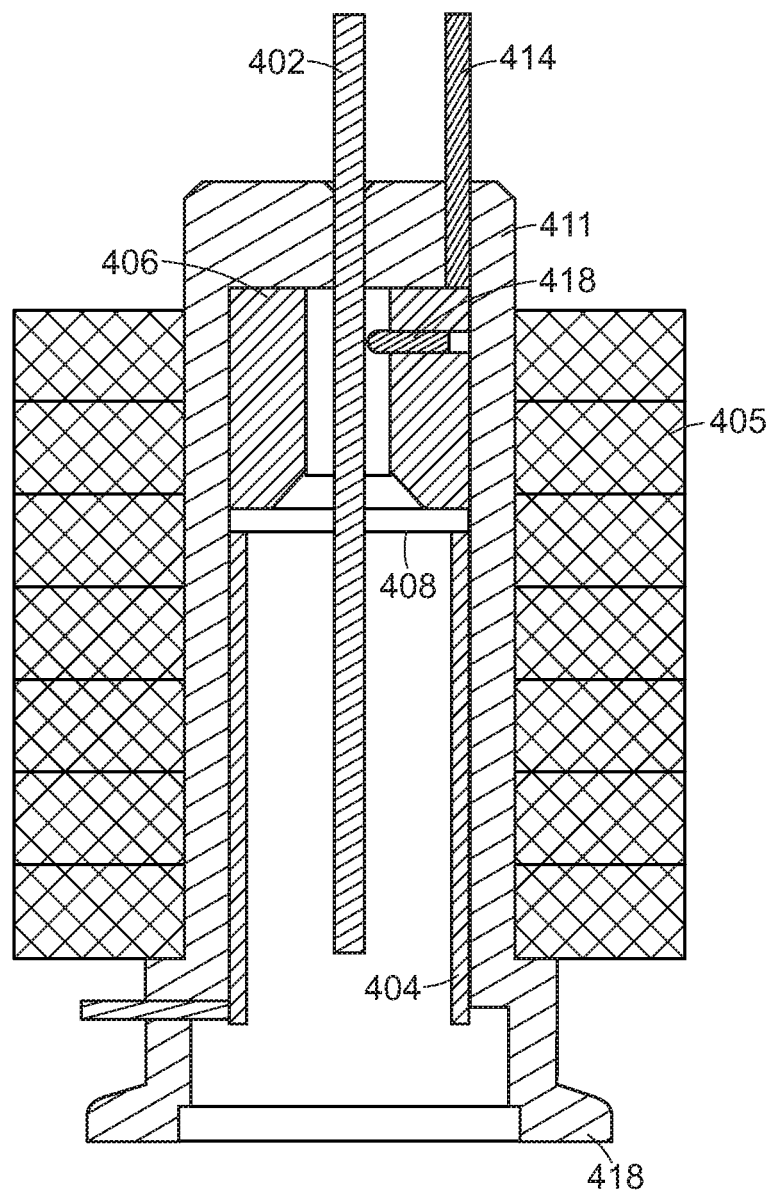
FIG. 4 is a longitudinal cross-sectional view of a modified CCIG embodying the present invention.

FIG. 4 illustrates a modified gauge structure to support implementation of the wide pressure range CCIG. As in the gauge disclosed in U.S. Patent Application 2015/0091579, the CCIG includes an anode 402 that extends axially into a cylindrical cathode (also referred to as a cathode cage) 404. Also, the cathode is surrounded by magnet assembly 405 to sustain a free electron plasma. Distinct from the prior gauge design, this gauge includes an additional cathode cylinder 406 in series with the cathode 404 and surrounding the anode 402 distal to the mouth of the gauge and flange 420. However, the cathode 406 is of a smaller diameter to provide a reduced spacing between the cathode and the anode and a resultant different electric field gradient. The two cathodes are isolated by an insulator 408. In this embodiment, both cathodes are surrounded by the magnet assembly 405. An optional modification of the gauge is use of a polymer housing 411 in accordance with the approach disclosed in PCT application U.S. 2016/013219, filed Jan. 13, 2016 by MKS Instruments Inc., and incorporated herein in its entirety by reference. The cathode structure may be set in the housing 411 in the molding operation of the housing 411, with electrodes 402 and 414 extending through the polymer housing to the respective large cathode 404 and small cathode 406.

It has been found that the Townsend plasma resides in the large cathode 404 at low pressures, but at higher pressures moves into the smaller cathode 406. A taper 416 at the mouth of the small cathode 406 can support the plasma transition from large cathode to small cathode.

FIG. 5 illustrates the large cathode current 502, small cathode current 504, combined currents 506 and anode voltage 508 over a wide pressure range of $10^{-6}$ Torr to $10^3$ Torr. Including two chambers in the cold anode ionization gauge design allows a reasonable discharge current to be delivered at a broad range of pressures. As the measured pressure increases, the molecular density also increases, which causes the mean free path between molecular collisions to be significantly reduced. Utilizing two chambers with different geometries enables each to be optimized to deliver a detectable discharge current for the expected molecular density and mean free path. The mechanism of current delivery through a gaseous medium is the creation of a plasma, and it has been observed that there are specific pressures (in the 10-200 Torr range) that cause the plasma to become unstable (oscillations and random fluctuations), which results in a widely variable apparent impedance, which then causes the discharge current to vary widely. This makes using an instantaneous measurement of discharge current to determine the measured pressure difficult. Since the voltage supply used on a CCIG is equipped with a current limiting resistor, it has been discovered that measuring the voltage after this current limiting resistor provides a more stable means to determine the discharge current present in the device. This eliminates the need for a sensitive measurement circuit to accurately resolve the delivered current, and downstream processing or filtering to compensate for the instabilities in the plasma. Since the measured voltage is fairly high, ranging from a few hundred to a few thousand volts, the design of this measurement circuit need not have the precision required to measure the low level, microampere range currents that are typically present.

Operation of the gauge would be as illustrated in FIG. 3, except that a second cathode 406 designed for that function replaces the guard ring in step 306.

The CCIG of FIG. 4 includes a plurality of cathodes; both cathodes have a common anode supplying the high voltage. The separate currents detected from each cathode over a pressure range have enabled us to use these as a means to determine when to switch from one measurement scheme to another. The two measurement schemes are either using current or resistance to infer pressure or only the anode voltage to infer pressure. The separate currents from each cathode allow an ability to detect whether we are in the low pressure region (<0.1 Torr) or in a high pressure region (>0.1 Torr).

When the measured pressure is increasing or decreasing, the current delivered to both cathodes will be measured, and an algorithm will be used to determine whether the measured value (which could be either voltage or current) from the first cathode or of the second cathode should be used as a basis for calculating the measured pressure. In one design, at low pressure (below 0.1 Torr), the total or sum current (as we have some current from both cathodes) may be used as a basis for calculating the measured pressure, and at around 0.1 Torr and above, the measured current switches solely to the smaller cathode, and we change to a measurement of anode voltage since the current response to pressure has little slope and we have low sensitivity. So by detecting the magnitude of the current in each cathode, we can determine which pressure range we are in, and hence whether we should use current or voltage to calculate pressure.

There are several important points to consider:
1. There are independent cathode cage currents to consider, and FIG. 5 shows that the small and large cage currents have their own pressure dependent characteristics.
2. There is anode voltage available for measurement as well.
3. The cathode currents can be used individually to determine pressure range and/or also be added up to improve linearity and/or sensitivity of the measurement.
4. The currents and voltages can be combined to provide discharge impedances.

FIG. 4 also illustrates another modification of the structure of the gauge in order to support Paschen's Law discharge at higher pressures approaching atmosphere. The feature 418 in this case is a cathode pin, possibly in the form of a set screw, in the inner surface of the small cathode 406 to provide a small spacing between the cathode 406 and the anode 402. The preferred spacing is in a range of 0.3 to 1.0 mm.

Upper pressure range measurement (1-760 Torr) for CCIGs presents technical challenges that are not present at pressures below 1 Torr: pressure dependent mode change, oscillatory discharge behavior and non-Townsend discharge characteristics. One issue that leads to significant instability is the movement in the position of the localized discharge throughout the high pressure cathode cage. This threaded cathode pin feature provides one way to control the location of the plasma in the Paschen's Law arc discharge region, eliminating the instabilities in spatial location and current and voltage spikes that result if the discharge is allowed to move around the cathode. This also gives us a method to set the operational electrical field between the anode and the cathode pin by adjusting the gap and the voltage between the anode and cathode to ensure enough potential gradient to always operate up to and even above 1 atmosphere.

At pressures between about 1 and 760 Torr, the CCIG plasma discharge tends to go from a uniform glow (Townsend discharge) to small confined bolts (arc discharge region) that jump around inside the cathode cage internal volume. Without the feature described in this disclosure, the bolt discharge changes location continuously around the cathode cage. The object of the cathode pin is to control the spatial location of the discharge and in the process minimize the spatial fluctuations.

The spatial fluctuations of the bolts result in spikes and/or oscillations in anode voltage and cathode current. Minimizing the effects of the large spatial fluctuations of the discharge smooth out the current and voltage, making a more reproducible device with a simple signal output to analyze.

The cathode pin—anode spacing is used to set and establish the breakdown voltage at higher pressures. The breakdown voltage is described as the minimum voltage at which a discharge current is detected. For nitrogen, there is a minimum in a plot of breakdown voltage against pressure between 0.1 and 10 Torr. For the gauge to operate properly at high pressures in the Paschen's Law region, we must always operate above the breakdown voltage to have a signal to derive pressure. The cathode pin—anode spacing is set such that discharge naturally occurs first between the cathode pin and the anode as it is the shortest path between the two.

The threaded cathode pin allows for small adjustments to the distance between the anode and the cathode. When a properly designed and located feature is used, the arc location is fixed, and the amount of discharge oscillations is reduced. The arc is visible to the bare eye.

At the high pressure region, the localized arc discharge can cause severe wear, due to sputtering, on both the anode and particularly on the cathode surfaces. This is the reason why alternative materials of construction have been considered. Stabilizing the arc location helps minimize signal fluctuation, and focuses sputtering damage on a single spot. The selection of material of construction for the cathode pin deserves careful consideration as it has direct impact on the long terms stability of the readings. Sputtering from the cathode feature may be minimized by using known sputter hardened material for the cathode feature such as iridium, titanium, tungsten or alloys of these materials. Also adding geometric features to the feature can compensate for wear and extend the life.

Sputtering damage can also be mitigated at high pressure by modulating the anode voltage to reduce the duty cycle from continuous (100%) to some smaller fraction (<100%). This allows the anode material to cool between discharge events and prevents melting of the anode surface.

At higher pressures, the arc discharge selectively falls on the shortest path provided by the cathode pin as that is the path with the highest potential gradient. At lower pressures that are dominated by a Townsend type discharge that is spatially uniform, the cathode pin would have little to no perturbation on the discharge. By controlling the arcs, we can limit or reduce the current and voltage spikes we see in this pressure region; controlling the minimum distance controls the breakdown voltage and location of the discharge. Controlling where and at what voltage the arcs occur allows for stable operation and minimal sputtering. Also, it allows for a larger diameter high pressure cathode cage for increased sensitivity in the middle pressure range. At the higher pressures, the discharges are strictly driven by electrostatics, and magnetic fields have very little influence on their behavior.

Figure 6C:
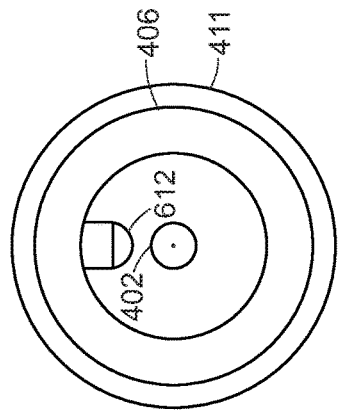
FIGS. 6A-6E illustrates alternative forms of cathode features used to induce Paschen Law discharge.
Figure 6B:
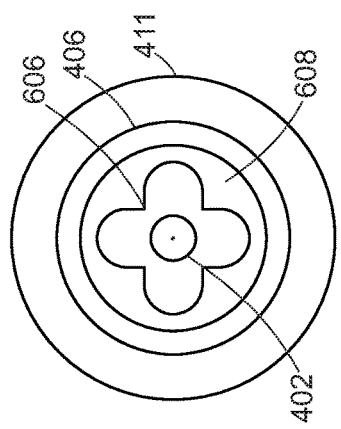
Figure 6E:
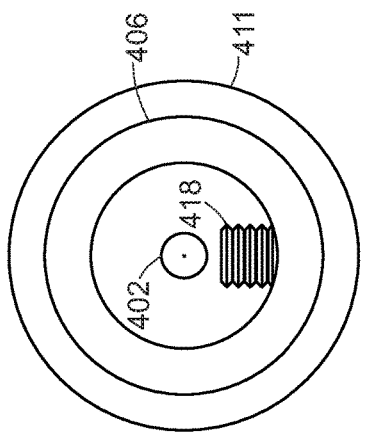

A threaded cathode pin 418 can be seen in an end view in FIG. 6E. Other cathode features that maintain an appropriate gap between the small cathode 406 and the anode included a hole 602 within a disc 604 in FIG. 6A, and tips 606 in a disc 608 in FIG. 6B, and the pin 612 in FIG. 6C. FIG. 6D illustrates nubs 610 protruding from the wall of the small diameter cathode 406.

Figure 7:
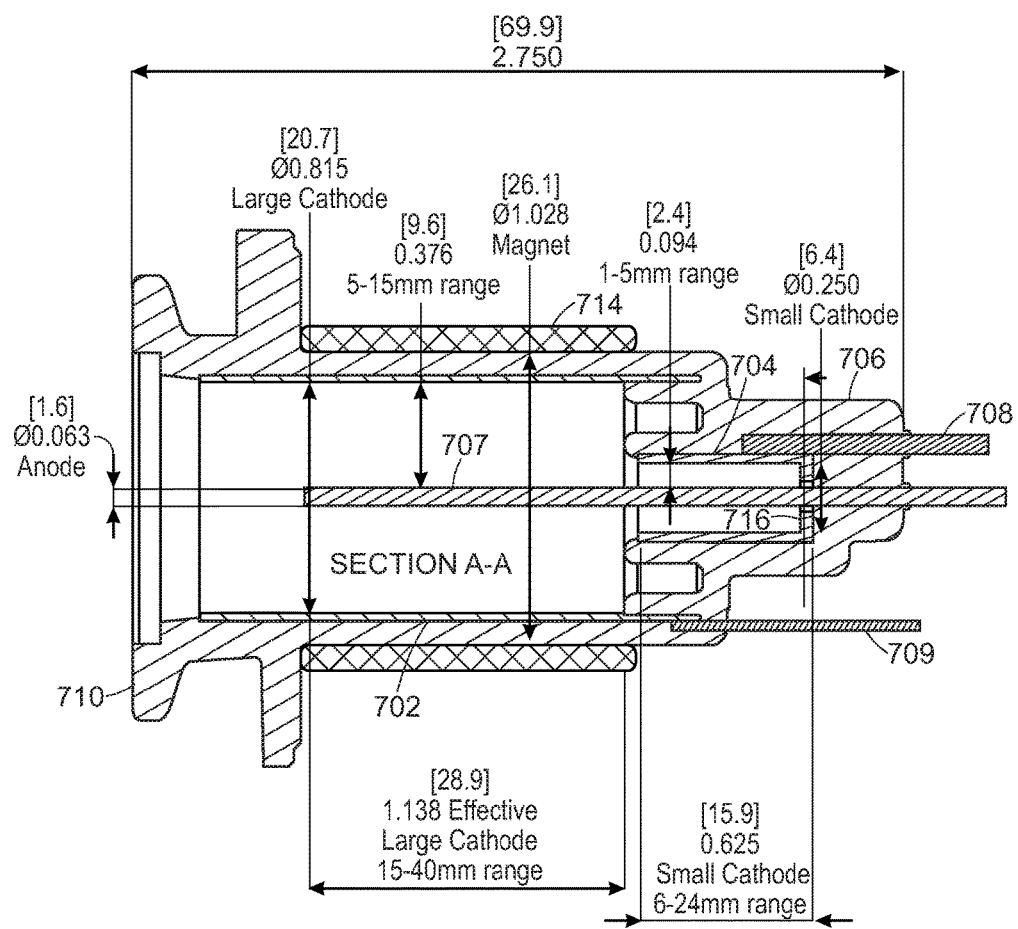
FIG. 7 illustrates a preferred embodiment of the invention.

The preferred embodiment of the gauge is illustrated in FIG. 7. Here a large diameter cathode 702 and small diameter cathode 704 are molded into a polymer housing 706 about anode 707, with the housing providing the isolation between the two cathodes. Electrode 708 extends to the small diameter cathode 704, and electrode 709 extends to the large diameter cathode. Alternatively, either electrode could extend through a side of housing 706. A magnet 714 surrounds only the large diameter cathode as magnetic field is less critical in supporting Townsend discharge in the smaller diameter cathode. A flange 710 is formed at the open end of the gauge to be coupled to a chamber, the pressures of which are to be monitored.

FIG. 7 also provides specific dimensions and preferred ranges of dimensions. For each dimension, the actual dimension in millimeters is provided in brackets. The actual dimension in inches is provided below that, and the preferred range in millimeters is provided below that. The length of the large cathode is an effective length which is the length within the magnet 714 and exposed to the gaseous environment. Although the cathode cylinder 702 extends beyond the magnet, the plasma with ionization is primarily limited to the region inside the magnet. The effective length of the small cathode, which is not within the magnet, is its entire length. For the high-pressure region in which that cathode operates, extending the magnet over the cathode would have little effect. Magnetic field from the magnet 714 would extend into that space but additional field with additional magnets surrounding the cathode would not be effective.

Figure 6A:
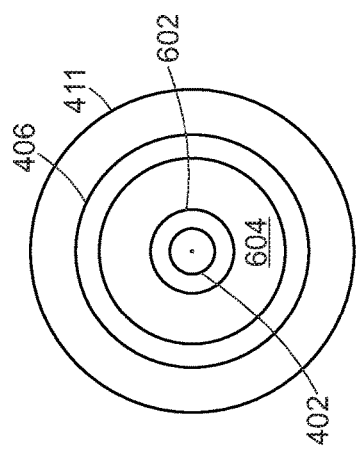
Figure 6D:
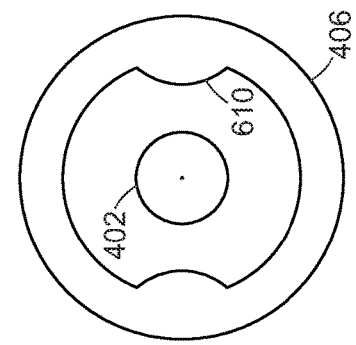

The Paschen Law feature 716 is of the type shown in FIG. 6A and provides a gap in the range of 0.3 to 1.0 mm, specifically 0.6 mm (0.024 inches). Any of the other features of FIGS. 6B-E could also be used. As before, the feature 716 supports an arc discharge at pressures approaching atmosphere. The feature is positioned toward the distal end of the second cathode 704 to leave the mouth of the cathode open for plasma discharge, although the feature could be positioned toward the proximal open end of the cathode. For molding purposes, the feature is at the distal end as shown.

The magnet used in this embodiment is about 800 or 900 gauss, within a preferred range of 500-1100 gauss.

Figure 8:
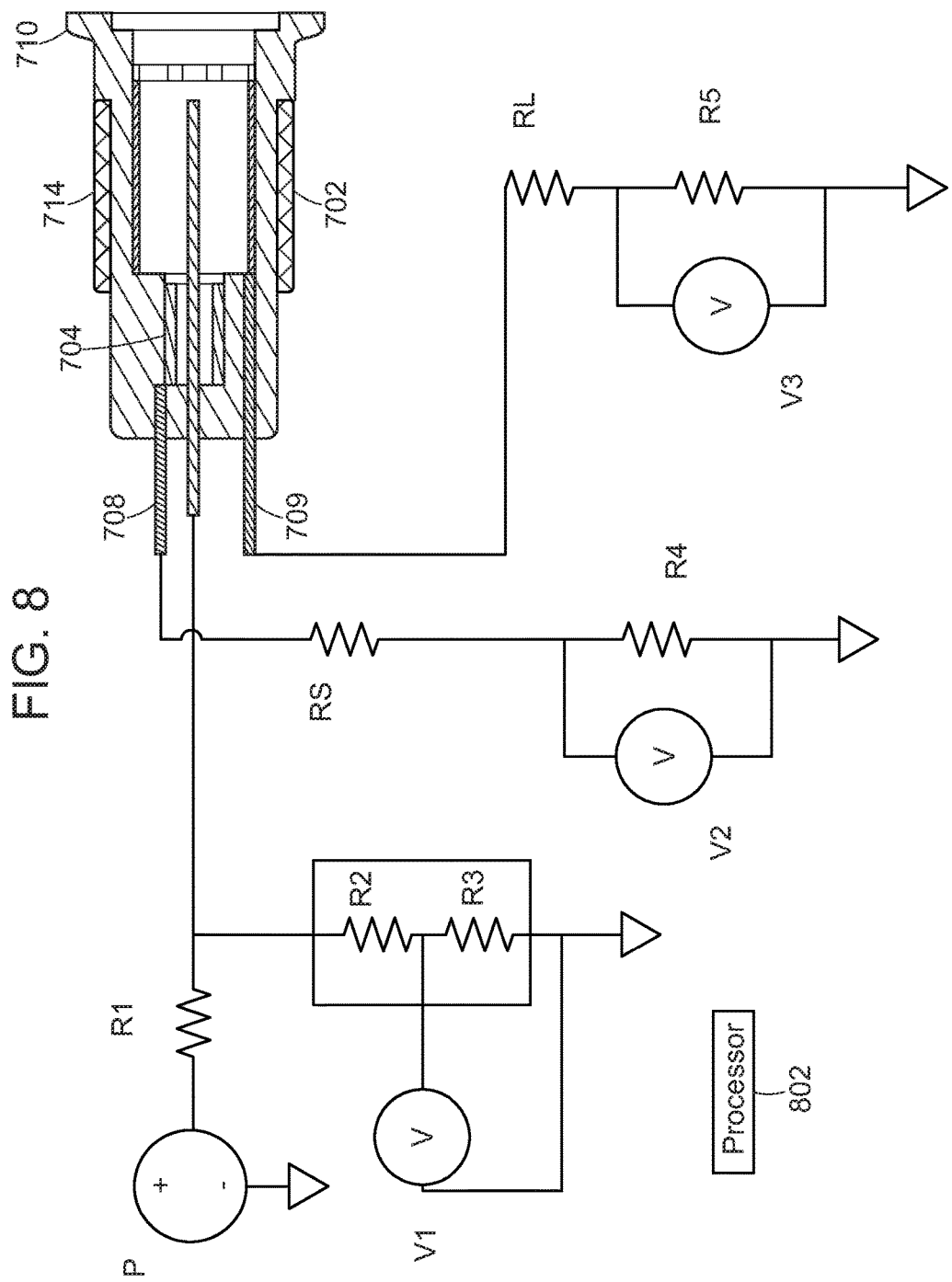
FIG. 8 illustrates the electric controller to be used with the several embodiments of the invention.

FIG. 8 illustrates the controller electronics for the gauge for use in any embodiment. As in prior circuits, power to the anode is applied from a power supply P through a current limiting resistor R1 that may be of high resistance such as 30 M$\Omega$. Voltage applied to the anode is sensed by voltage sensor V1 coupled to a voltage divider R2, R3 to ground. Alternatively, the anode voltage could be determined from the voltage output of the supply P and a sensed voltage drop across the resistor R1. Current from the large cathode 702 and electrode 709 is detected by means of a voltage sensor V3 coupled across current sensing resistor R5 which may, for example be about 50 k$\Omega$. Current from the small cathode and its electrode 708 may be sensed by a voltage sensor V2 coupled across a current sensing resistor R4 which may also, for example, be about 50 k$\Omega$. A processor 802 controls the power supply, varies any variable resistance, and receives the sensed signals. It also outputs pressure readings as discussed with respect to FIG. 10.

Of particular significance in this circuit are the additional resistors RS coupled to the small cathode 704 and resistor RL coupled to the large cathode 702. In an initial design, resistors of 523 k$\Omega$ were used for both RL and RS to smooth out noise, and filter out oscillations, from the output signals from the cathodes. However, with much larger resistances of over one M$\Omega$ the shapes of the current outputs with respect to pressure were able to be controlled to provide much more accurate pressure readings. In particular, the resistor RS to the small cathode was increased to 30 M$\Omega$, with the resistance RL to 1.27 or 2.04 M$\Omega$. With the very high resistor at the small cathode, more current was pushed into the large cathode to increase the slope magnitude at high pressures over 1 Torr. To allow for dynamic control of the pressure response with varying conditions such as different gas species, the resistors RL and RS, particularly RS, may be variable resistors.

Figure 9A:
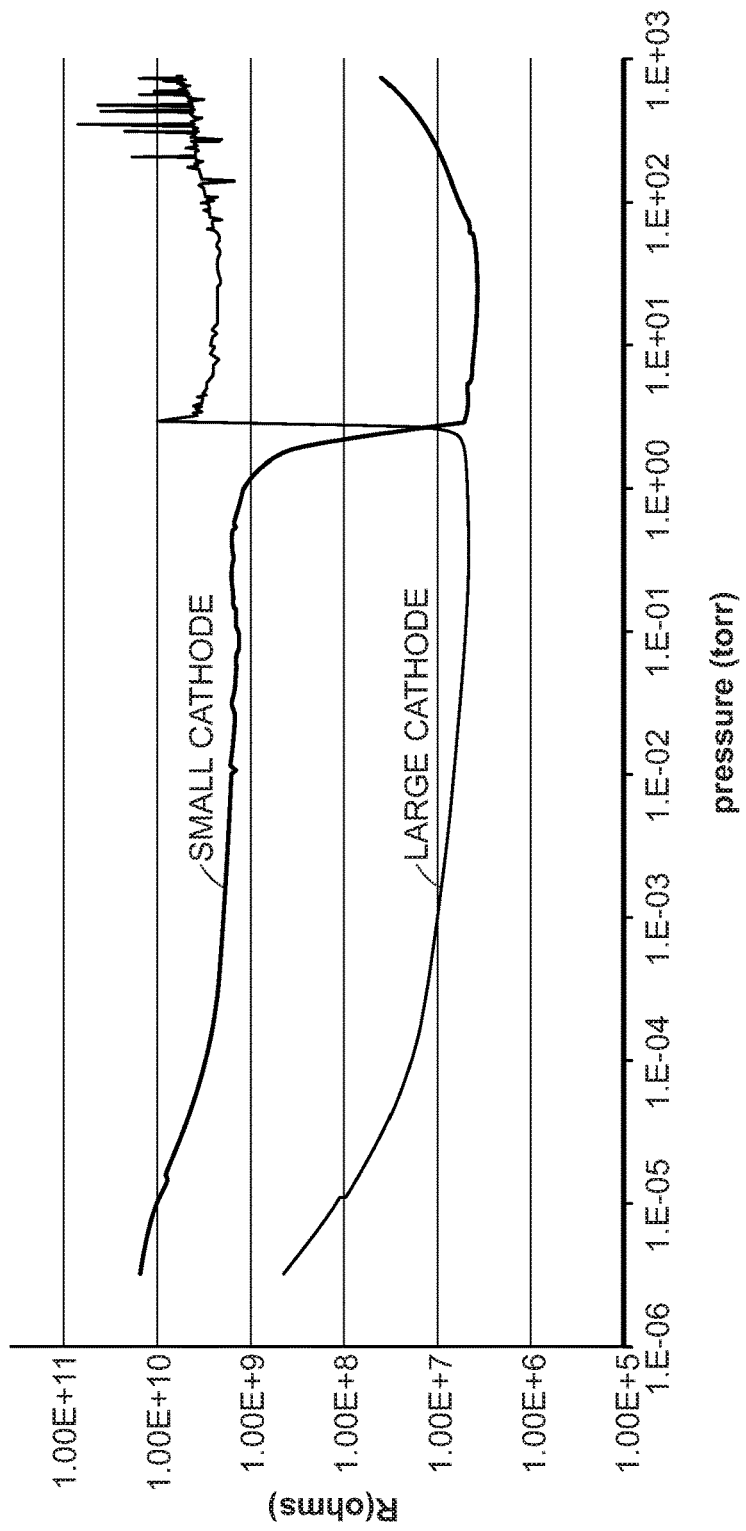
FIGS. 9A and B illustrate impedance measurements, with different cathode resistors, based on cathode currents and anode voltage through a wide range of pressure measurements.

FIGS. 9A and B illustrate the output impedance, computed as the ratio of anode voltage to cathode current, for each cathode of the device of FIG. 7 using the circuit of FIG. 8. FIG. 9A is for RS and RL of 523 k$\Omega$ each. FIG. 9B is for RL equal to 1.27 M$\Omega$ and RS equal to 30 M$\Omega$. Adjustment of the cathode resistances also enabled shifting the point of local minimum in the respective currents and impedances to create a sensor with no regions in sensed signals where pressure cannot be resolved and displayed with adequate accuracy.

Five distinct regions of operation can be identified in FIG. 9B. At low pressures below $10^{-2}$ Torr, the gauge operates with the Townsend plasma discharge of the larger cathode much as in the standard CCIG. At still low pressures in the region of $10^{-2}$ to about 1 Torr, operation of the large cathode with Townsend plasma discharge was extended using the resistances RS and RL. In the region of about 1 Torr to about 35 Torr, the plasma activity in the small cathode increases (impedance drop), the plasma shifting from the large cathode to the small cathode. Here, the impedance measurement from the large cathode begins to increase as the impedance of the small cathode decreases. As the transition continues, from about 35 to about 89 Torr, the small cathode plasma begins to turn off and the current moves to that resulting from breakdown voltage as the large cathode current continues to decrease resulting in high impedance. Finally, at pressures above about 89 Torr to about atmosphere, 760 Torr, the current discharge is a Paschen's Law arc discharge across the small gap provided by the additional feature on the small cathode.

Figure 10A:
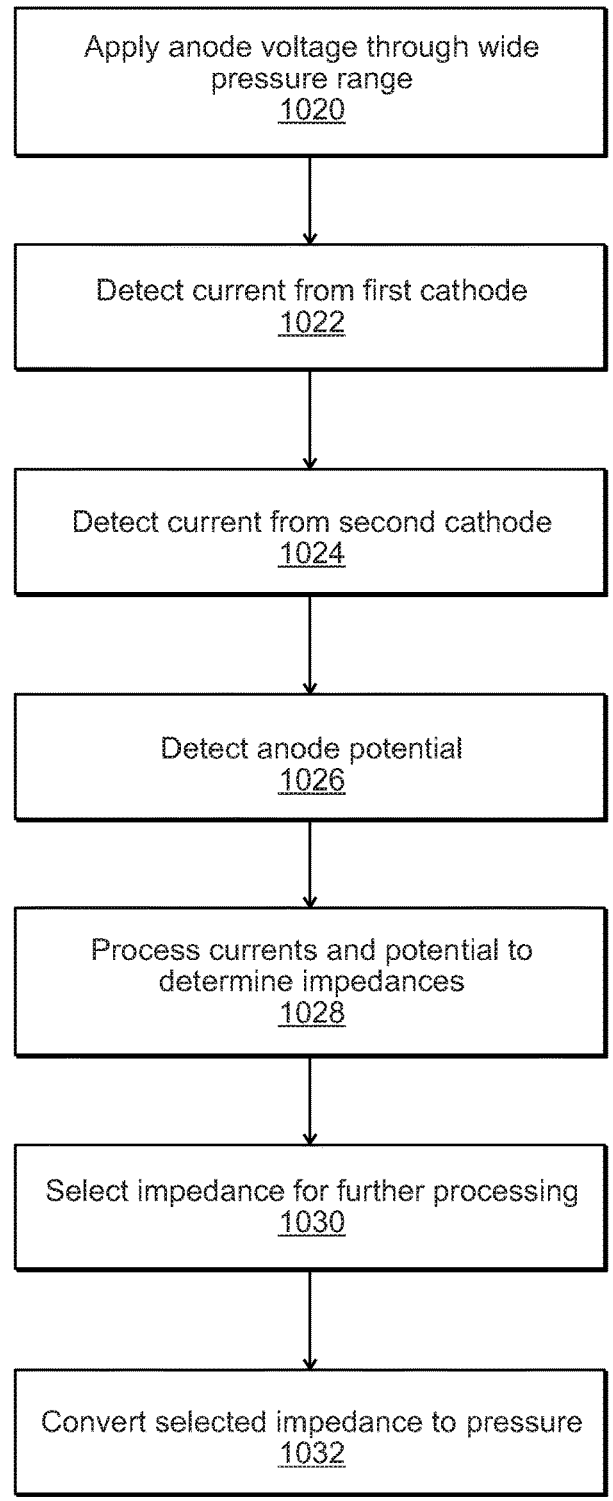
FIGS. 10A and B illustrate processing by the processor 802 to determine pressure from the impedance measurements of FIG. 9B.

Processing of the algorithm of FIG. 9B may be as illustrated in FIG. 3 with the exception that the current detected in step 306 is that of the second cathode, designed for that function. FIG. 10A illustrates a more detailed process. Anode voltage is applied to the anode through a large pressure range 1020. Current is detected from the first cathode at 1022 and from the second cathode at 1024. Anode voltage is detected at 1026. A more detailed description of the step 310 for processing current and potential to determine pressure is presented in steps 1028, 1030 and 1032. At 1028, the cathode current and anode potential are processed to determine impedances of the respective cathodes. At 1030, one of those impedance is selected for further processing depending on the pressure region. As illustrated in FIG. 9B, the impedance showing solid lines is selected for each of four pressure regions. At 1032, the selected impedance is converted to pressure. In one embodiment, the selection and conversion steps 1030 and 1032 are performed as in FIG. 10B.

Figure 10B:
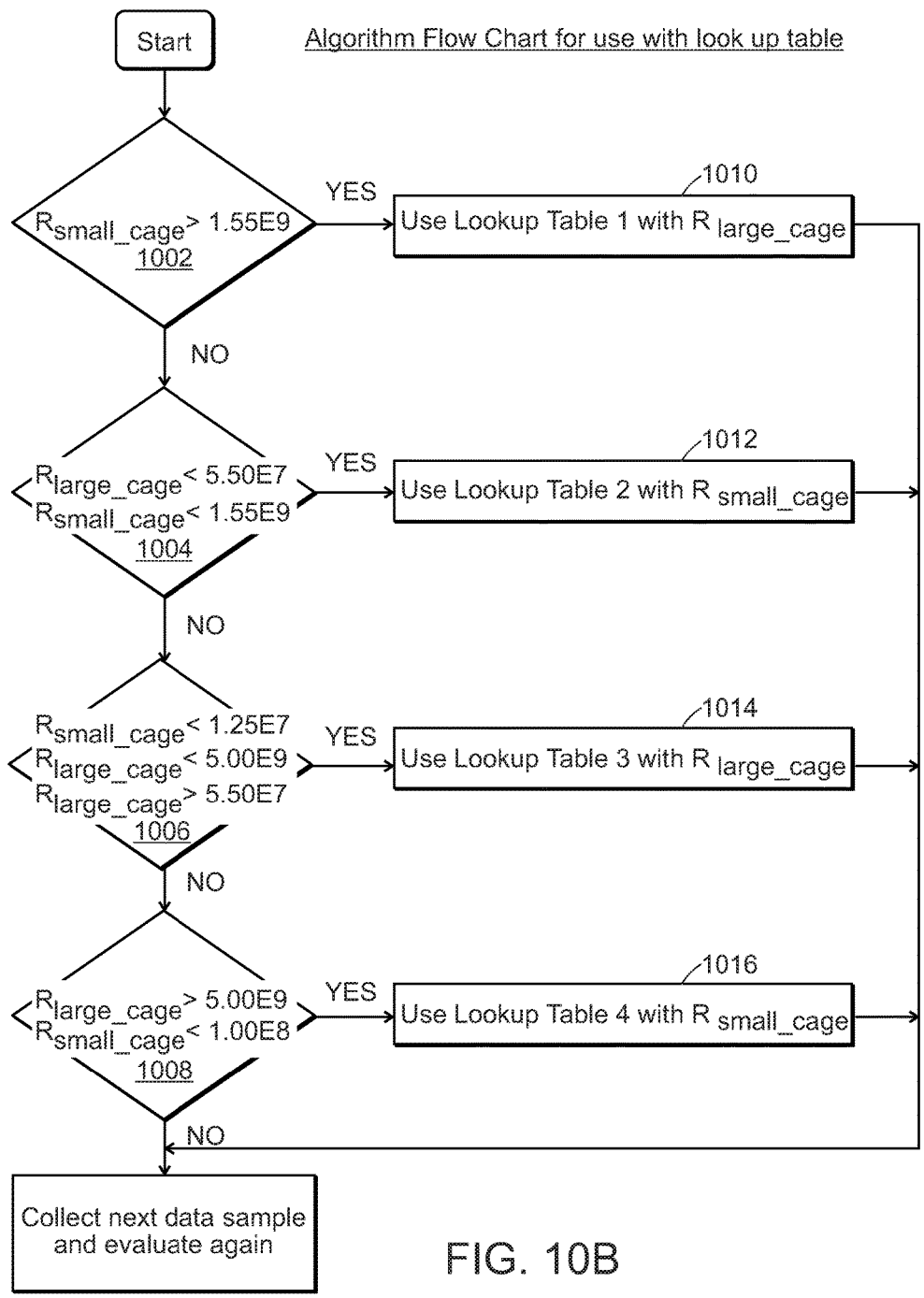

FIG. 10B illustrates controller processor logic for accessing each of four distinct lookup tables to convert either large cathode impedance or small cathode impedance to the output pressure. The four lookup tables correspond to the four solid lines of the impedance plot of FIG. 9B and are selected according to the impedances of the large and small cathodes. As illustrated in FIG. 9B, at low pressures corresponding to the standard CCIG and the extended standard CCIG, pressure is determined based on the impedance of the large cathode. In this pressure region, decision block 1002 directs the processor to look up table 1 at 1010 Then, over the region of smaller cathode plasma activity from about 0.5 to 35 Torr, the system switches to follow small cathode impedance to determine the pressure. Decision block 1004 directs the processor to table 2 at 1012. Then, to avoid the minimum seen in the small cathode impedance from about 35 to 89 Torr, the system switches back at 1006 to follow the impedance of the large cathode in lookup table 3 to determine pressure at 1014. Finally, as the large cathode impedance approaches its peak, the system switches back to follow the small cathode impedance in table 4 at 1016. Thus, as can be seen from FIG. 10B, through each data sample, the system walks through the decision boxes of 1002, 1004, 1006 and 1008 to decide on a lookup table to be used to identify pressure for that data sample in 1010, 1012, 1014 or 1016. After each lookup or if the decision tree fails to identify a lookup table, the system moves on to the next sample.

Although the process has been described in terms of moving from low pressures to atmosphere, it will be understood that any data sample may direct the processor to any lookup table without regard to any pressure history.

Figure 11:
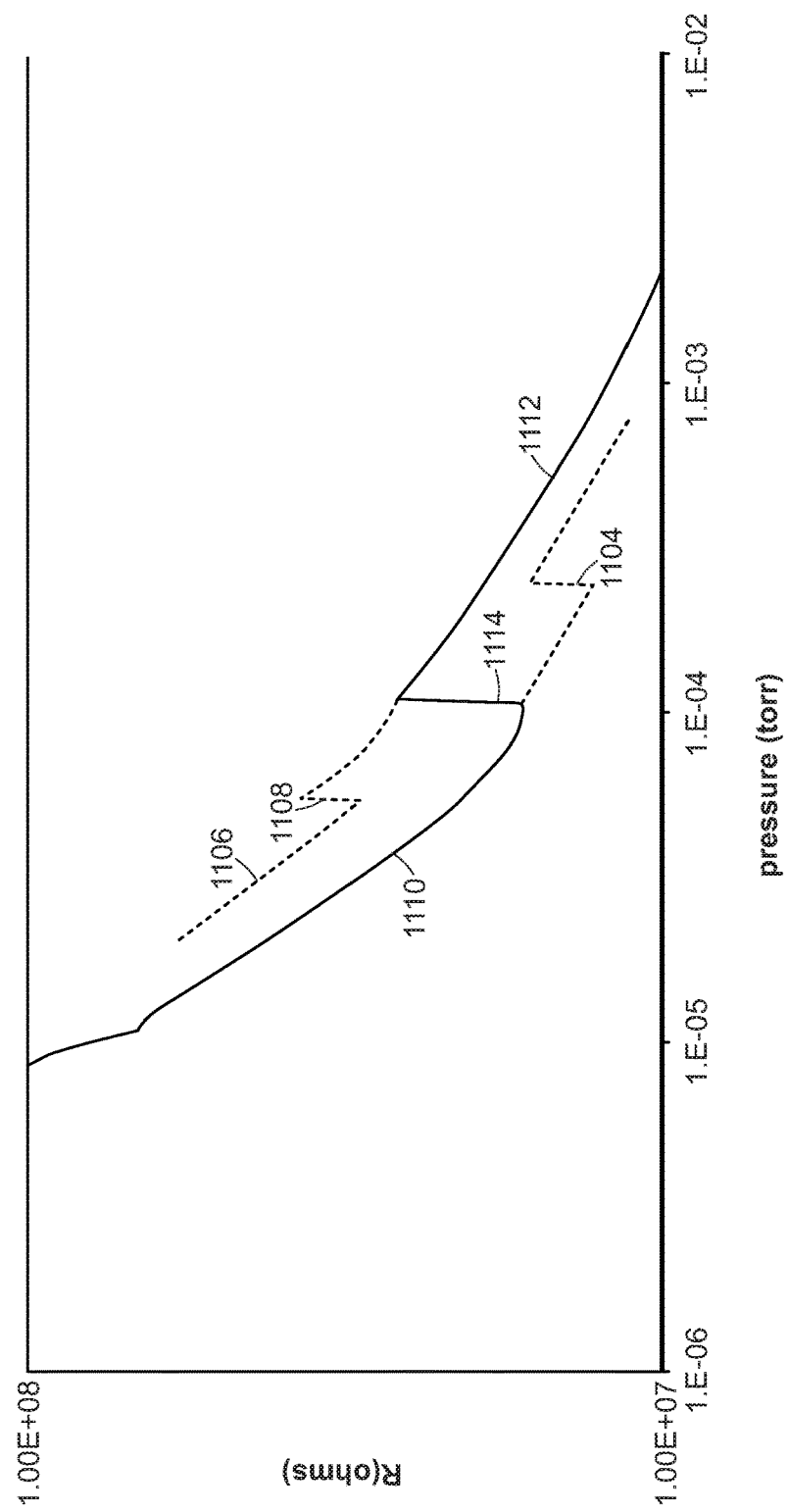
FIG. 11 illustrates an alternative use of the invention to avoid discontinuities in a gauge output.

FIG. 11 illustrates another use of the multiple cathodes, either with the wide pressure range design as just described or with more conventional pressure ranges such as below $10^{-2}$ Torr. CCIGs often have discontinuities in their outputs. For example, a gauge having a single cathode may have an impedance that follows the curve 1102, showing a discontinuity at 1104. At that discontinuity, it is difficult to provide accurate pressure readings. By using two cathodes, a second having an impendence response following the path 1106, for example, with a discontinuity at 1108, the discontinuities can be avoided in determining pressure. At low pressures the pressure might be determined from the impedances provided by the large cathode along the line 1110. The large cathode would be used to pressures above the pressure at which the discontinuity 1108 occurs. However, at some pressure below where the discontinuity 1104 would occur for the large cathode, the system would transition at 1114 to rely on the small cathode impedance output along line 1112. As a result, the discontinuities are avoided.

Figure 12:
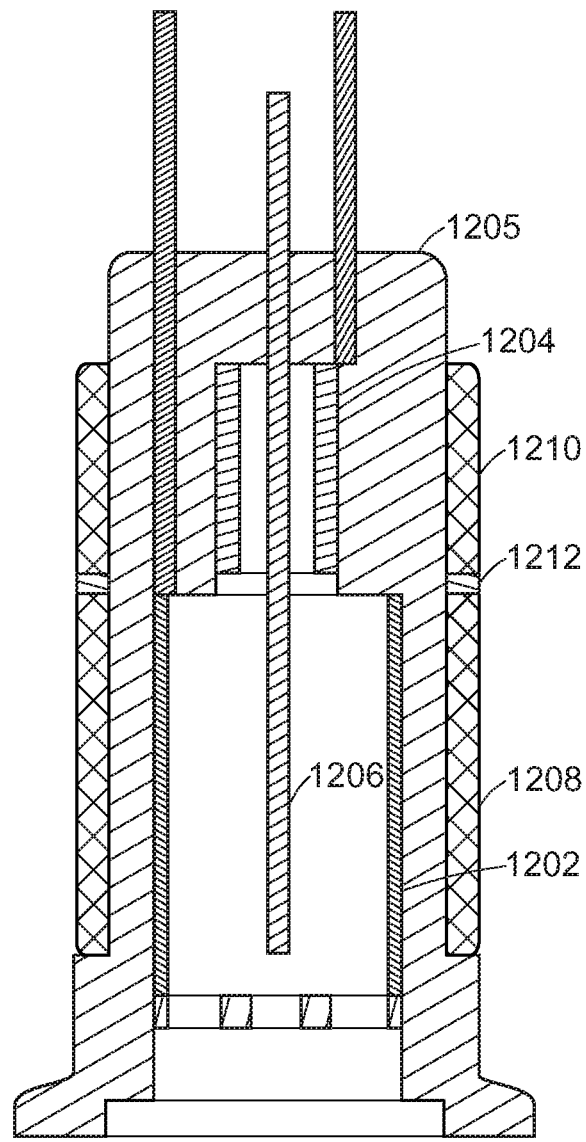
FIG. 12 illustrates an alternative embodiment of the invention particularly designed to enable avoidance of discontinuities.

The previously illustrated dual cathode embodiments may be utilized to avoid the discontinuities. Another embodiment is shown in FIG. 12. Two electrically isolated cathode sleeves 1202 and 1204 may be mounted in a housing 1205 of polymeric material as previously described, for example. Cathodes surround the center of anode 1206. Each cathode has a respective ring magnet 1208, 1210 surrounding it. The magnets may be in repelling or "bucking" condition so that two separate discharge regions are produced, one in each cathode. By changing resistance at the cathodes, changing the physical size of one cathode relative to the other, and changing the magnetic fields, the discontinuities can be moved to different pressure ranges. By knowing the response of each cathode, the discontinuities can be avoided by making the transition 114 of FIG. 11 at a predetermined pressure. Alternatively, by looking at the ratio of currents of the two separate cathodes, it can be determined when a discontinuity is present. In that case, the other cathode current is used to report pressure. This is essentially always having a reference pressure, but alternating which one is the reference.

Figure 1A:
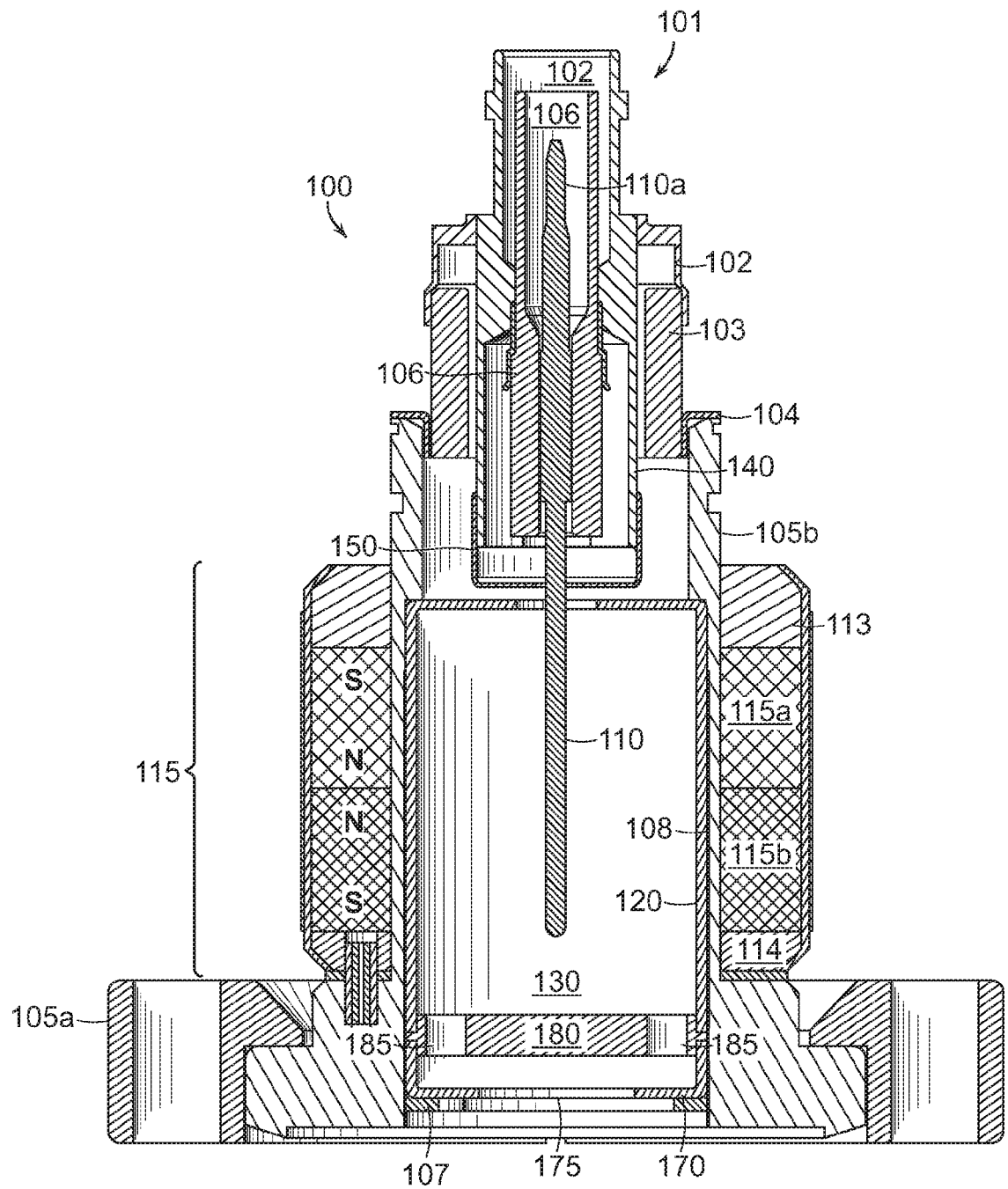
FIG. 1A illustrates a prior art CCIG to which the present invention may be applied.
Figure 1B:
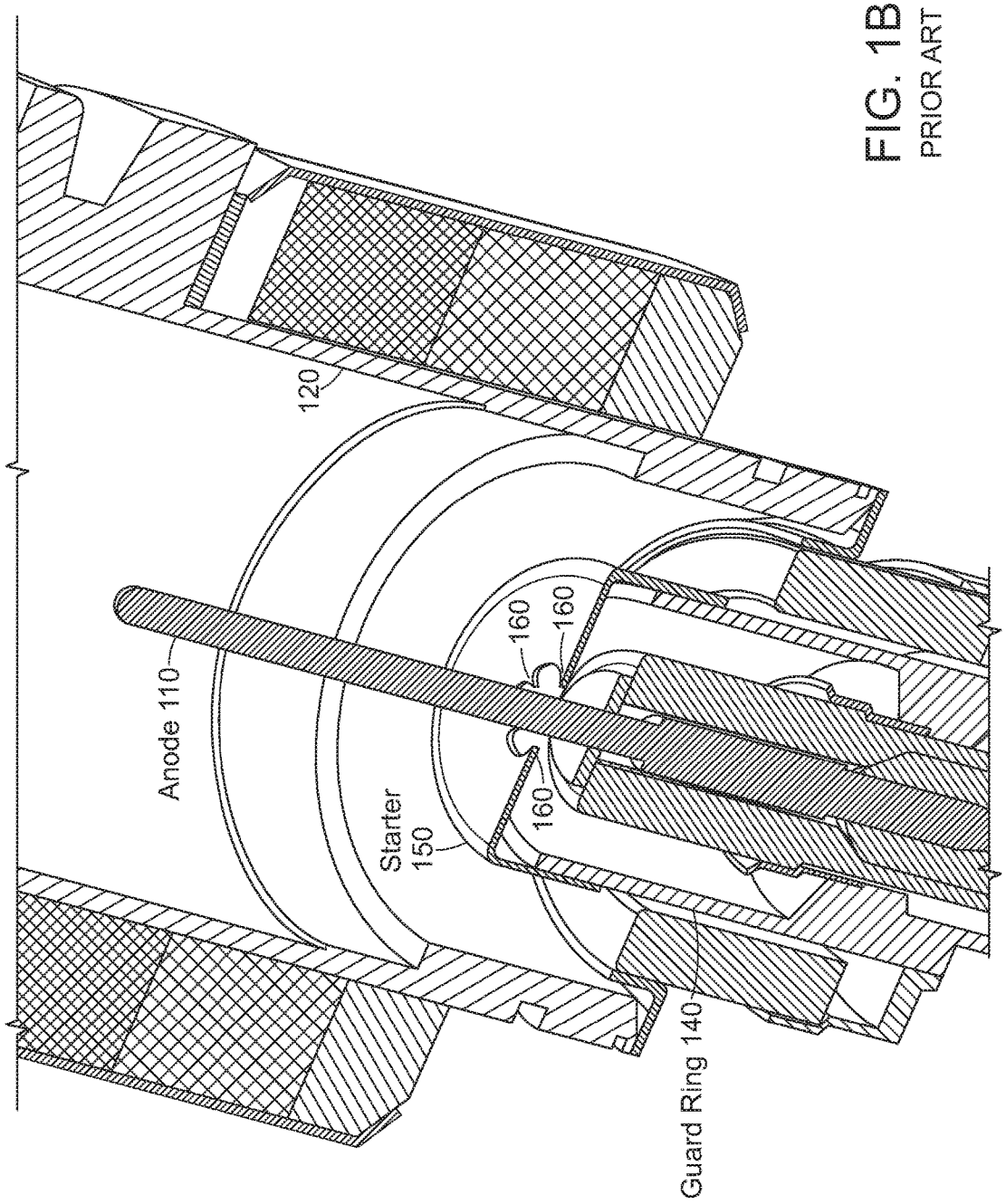
FIG. 1B is an enlarged perspective view of the anode and starter ring of the gauge of FIG. 1A.
Figure 1C:
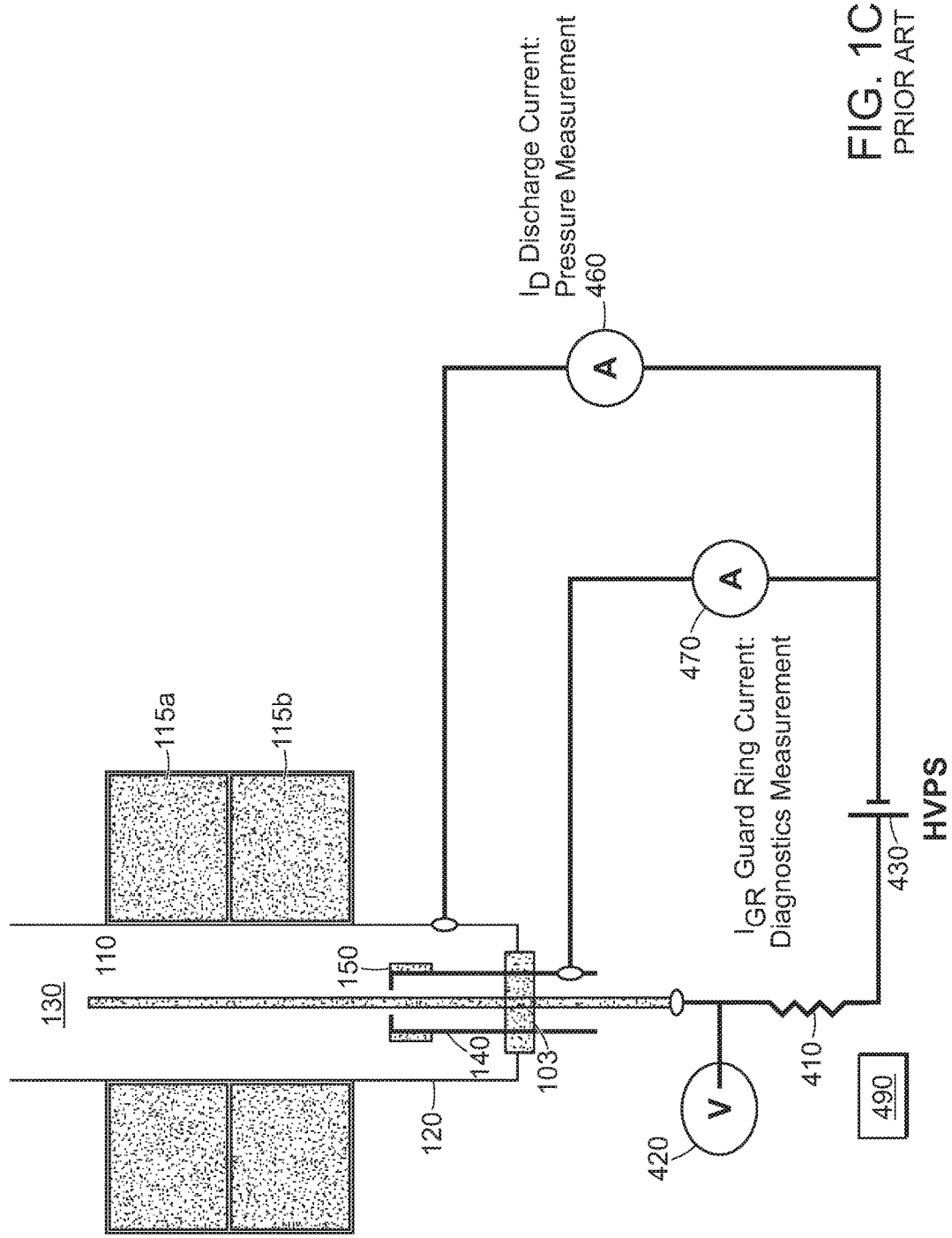
FIG. 1C illustrates the electric controller associated with the gauge of FIG. 1A.

It can be seen from the above examples that the magnetic field may be established through many different approaches. For example, FIG. 1A illustrates dual magnets surrounding the larger cathode only. FIG. 4 illustrates a magnet assembly surrounding both cathodes. FIG. 7 illustrates a single magnet surrounding only the large cathode. FIG. 12 illustrates separate magnets surrounding the separate cathodes. This arrangement may also be used for extending pressure range. It will be recognized that other arrangements are also feasible.

Figure 13A:
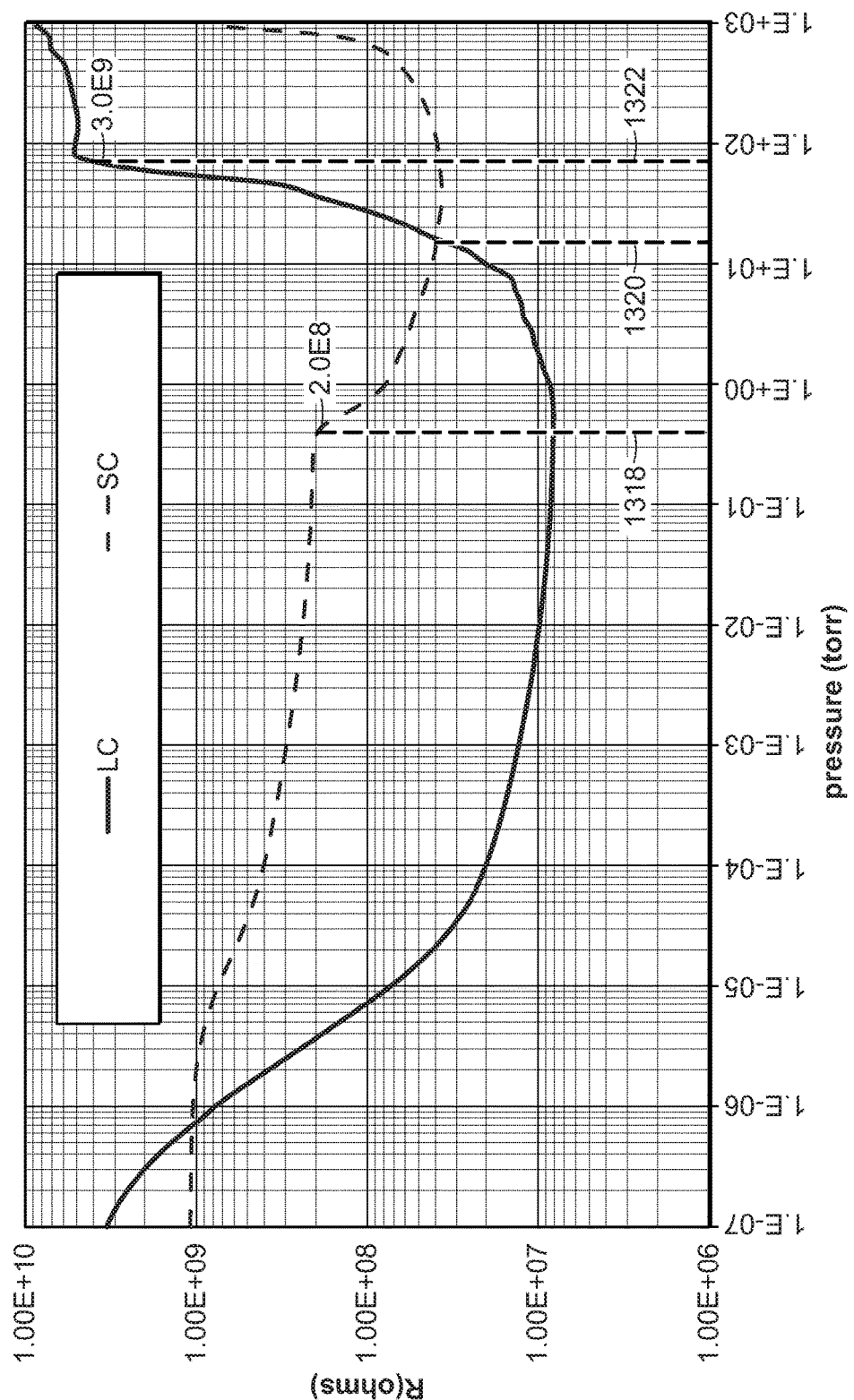
FIG. 13A is a plot of impedance measurements similar to FIG. 9B but for a device with different output characteristics.
Figure 13B:
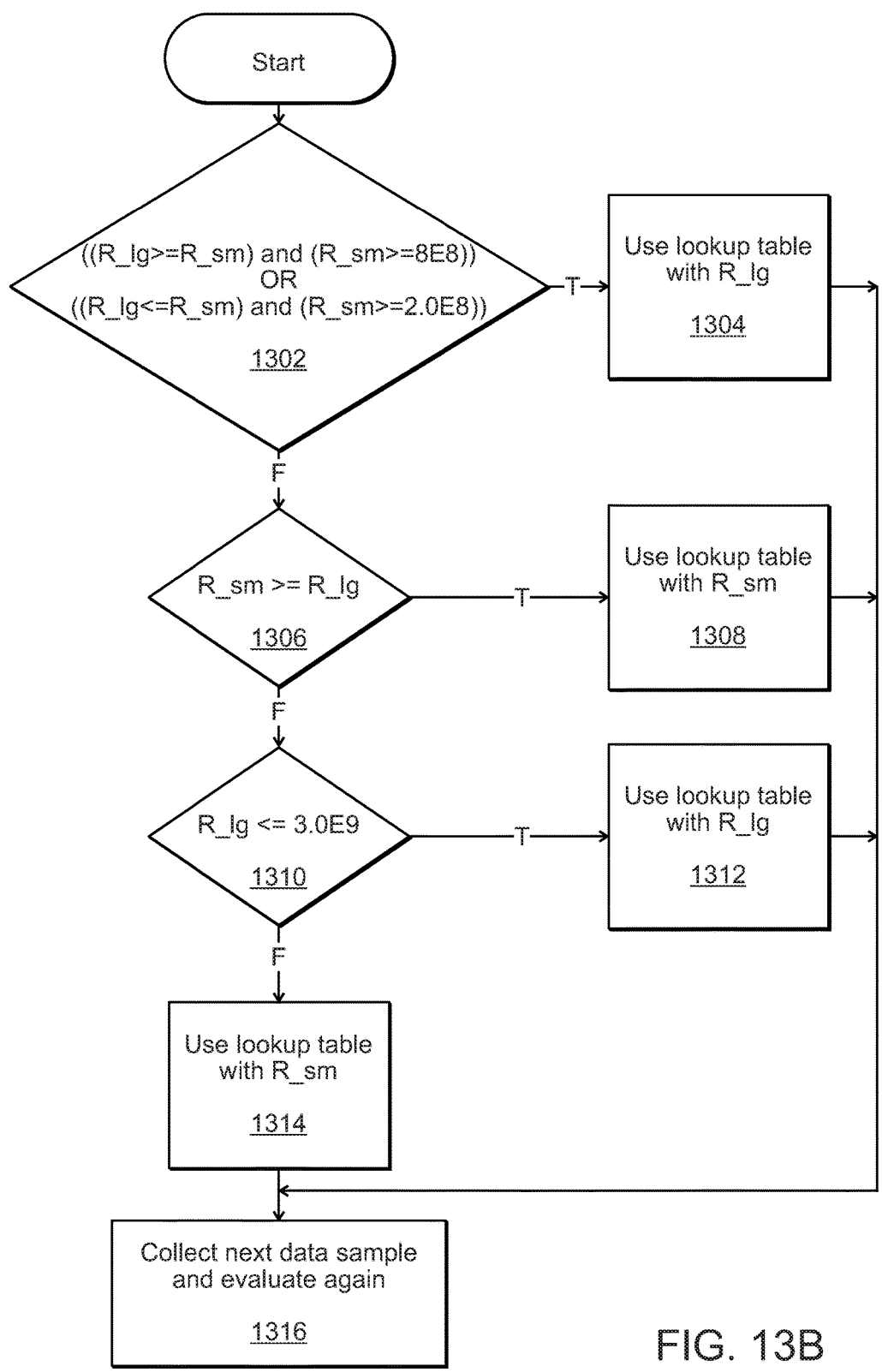
FIG. 13B is a flowchart similar to FIG. 10B but for the device having the characteristics of FIG. 13A.

FIG. 13A provides a plot similar to FIG. 9B but for a device having different output characteristics. Impedances of the small cathode are shown in the broken line, and impedances of the large cathode are shown in the solid line. FIG. 13B illustrates a flowchart similar to FIG. 10B but with the device having the characteristics of FIG. 13A. As before, at the lowest pressures, a lookup table for the large cathode is used to provide a pressure reading. At decision block 1302, if it is determined that the impedance of the large cathode is larger than that of the small cathode at impedances of the small cathode greater than 8 E8, or if the large cathode impedance is less than the small impedance but the small impedance remains above 2.0 E8, the lookup table with large cathode impedances is used to determine pressure. Thus the large cathode lookup table is used for all pressures below 1318 in FIG. 13A. If the conditions of decision block 1302 are not met, but impedance of the small cathode is found to be greater than that of the large cathode at decision block 1306, then the lookup table for the small cathode is used to provide pressure readings at 1308. Thus, the small cathode output is used between the pressures at 1318 and 1320 in FIG. 13A.

If the conditions of decision blocks 1302 and 1306 are not met, then decision block 1310 determines whether the large cathode impedance is less than 3.0 E9. If so, the large cathode lookup table is used at 1312, between pressures 1320 and 1322 in FIG. 13A. Finally, if the conditions of the decision blocks 1302, 1306 and 1310 are not met, a small cathode lookup table is used at 1314 above pressures at 1322.

Once pressure is determined through one of the lookup tables, the next data sample is collected at 1316 for evaluation as in FIG. 13B.

While this invention has been particularly shown and described with references to example embodiments thereof, it will be understood by those skilled in the art that various changes in form and details may be made therein without departing from the scope of the invention encompassed by the appended claims.

What is claimed is:
1. A cold cathode ionization gauge comprising:
   an anode;
   a first cathode spaced from the anode by a first spacing sufficient to enable, at low pressures, formation of a plasma between the anode and the first cathode and a resultant ion current flow into the first cathode;

a second cathode electrically isolated from the first cathode and spaced from the anode by a second spacing less than the first spacing, the second spacing enabling electric discharge at pressures higher than the low pressures required for plasma formation in the first spacing;

a magnet applying a magnetic field through at least the first spacing to lengthen free electron paths to sustain the plasma;

an electric controller that applies voltage between the anode and each of the first and second cathodes to create ionization with plasma discharge at least between the anode and the first cathode at the low pressures and electric discharge between the anode and the second cathode at pressures higher than the low pressures, the controller determining pressure based on measured current flow to the first cathode and on measured current flow to the second cathode.

2. The cold cathode ionization gauge of claim 1 wherein the controller determines first cathode impedance and second cathode impedance from the measured current flow to the first cathode, the measured current flow to the second cathode and measured anode voltage, and pressure is determined based on the first cathode impedance and the second cathode impedance.

3. The cold cathode ionization gauge of claim 2 wherein pressure is determined based on the first cathode impedance and the second cathode impedance over respective ranges of pressure, including nonadjacent ranges of pressure in which the pressure is determined based on the first cathode impedance.

4. The cold cathode ionization gauge of claim 1 wherein the first and second cathodes surround the anode.

5. The cold cathode ionization gauge of claim 4 wherein each cathode is cylindrical, the different spacings being determined by respective radii.

6. The cold cathode ionization gauge of claim 5 comprising only two cylindrical cathodes.

7. The cold cathode ionization gauge of claim 5 wherein the spacing between the anode and the first cathode is within a range of 5 to 15 millimeters and the first cathode has an effective length along the magnet in the range of 15 to 40 millimeters along the anode.

8. The cold cathode ionization gauge of claim 7 wherein the spacing between the anode and the second cathode is in a range of 1 to 5 millimeters and the second cathode has a length in a range of 6 to 24 millimeters along the anode.

9. The cold cathode ionization gauge of claim 8 wherein the second cathode comprises a feature directed toward the anode that establishes a narrow gap between the anode and the feature in a range of 0.3 to 1.0 millimeters to enable Paschen's Law discharge between the anode and the feature on the second cathode at high pressures approaching atmospheric pressure.

10. The cold cathode ionization gauge of claim 9 wherein the electric controller includes impedance of at least a megaohm between the first cathode and a return to the power supply and an impedance between the second cathode and the return to the power supply that it is at least an order of magnitude larger than the impedance between the first cathode and return to the power supply.

11. The cold cathode ionization gauge of claim 5 wherein the spacing between the anode and the second cathode is in a range of 1 to 5 millimeters and the second cathode has a length in a range of 6 to 24 millimeters along the anode.

12. The cold cathode ionization gauge of claim 11 wherein the second cathode comprises a feature directed toward the anode that establishes a narrow gap between the anode and the feature in a range of 0.3 to 1.0 millimeters to enable Paschen's Law discharge between the anode and the feature on the second cathode at high pressures approaching atmospheric pressure.

13. The cold cathode ionization gauges of claim 5 wherein the first and second cathodes are set in a polymer housing that electrically insulates the first and second cathodes.

14. The cold cathode ionization gauge of claim 1 wherein the spacing between the anode and the second cathode is in a range of 1 to 5 millimeters and the second cathode has a length in a range of 6 to 24 millimeters along the anode.

15. The cold cathode ionization gauge of claim 14 wherein the second cathode comprises a feature directed toward the anode that establishes a narrow gap between the anode and feature to enable Paschen's Law discharge between the anode and the feature.

16. The cold cathode ionization gauge of claim 15 wherein the gap between the anode and the feature is in a range of 0.3 to 1.0 millimeters.

17. The cold cathode ionization gauge of claim 15 wherein the feature is a disc and the gap is formed in a hole within the disc.

18. The cold cathode ionization gauge of claim 15 wherein the feature is a disc and the gap is formed between the anode and a tip extending from the disc.

19. The cold cathode ionization gauge of claim 15 wherein the feature is a pin.

20. The cold cathode ionization gauge of claim 15 wherein the feature is a threaded pin.

21. The cold cathode ionization gauge of claim 15 wherein the electric controller includes impedance of at least a megaohm between the first cathode and a return to the power supply and an impedance between the second cathode and the return to the power supply that it is at least an order of magnitude larger than the impedance between the first cathode and return to the power supply.

22. The cold cathode ionization gauge of claim 1 wherein the electric controller includes an impedance of at least a megaohm between each cathode and a return to a power supply.

23. The cold cathode ionization gauge of claim 22 wherein the impedance from the second cathode is at least an order of magnitude larger than the impedance from the first cathode.

24. The cold cathode ionization gauge of claim 22 wherein at least one of the impedances is provided by a variable resistance.

25. The cold cathode ionization gauge of claim 22 wherein the electric controller selects one of plural algorithms to provide pressure output based on electrical measurements, the electric controller selecting the algorithm based on impedance measurements between the anode and each cathode.

26. The cold cathode ionization gauge of claim 25 wherein the algorithms are processed using precomputed data stored in lookup tables.

27. The cold cathode ionization gauge of claim 1 wherein pressure is determined based on electrical outputs from each of the first and second cathodes over distinct ranges of pressure including nonadjacent ranges of pressure in which the pressure is determined based on the first cathode output.

28. The cold cathode ionization gauge of claim 27 wherein the pressure is based on an output of the first cathode for a first low pressure range, based on an output of the second cathode over a second pressure range higher than the first pressure range, based on an output of the first cathode over a third pressure range higher than the first and second pressure ranges, and based on an output of the second cathode over a fourth pressure range higher than the first, second and third pressure ranges.

29. The cold cathode ionization gauge of claim 1 wherein at least a Townsend plasma discharge is supported between the anode and the first cathode at low pressures, and at least a breakdown discharge is supported between the anode and the second cathode at pressures higher than the low pressures.

30. The cold cathode ionization gauge of claim 29 wherein the Townsend discharge is also supported between the anode and the second cathode at pressures higher than the low pressures.

31. The cold cathode ionization gauge of claim 29 wherein the breakdown discharge is supported at a feature of the second cathode.

32. The cold cathode ionization gauge of claim 29 wherein the breakdown discharge is supported at a feature of one of the second cathode and the anode that reduces the spacing between the second cathode and anode.

33. The cold cathode ionization gauge of claim 1 wherein at least a Townsend plasma discharge is supported between the anode and the first cathode at low pressures, and at least a Townsend discharge is supported between the anode and the second cathode at pressures higher than the low pressures.

34. A cold cathode ionization gauge of claim 1 wherein each cathode is cylindrical, surrounding the anode, the different spacings being determined by respective radii, at least one of the cathodes being tapered in inner surface diameter.

35. The cold cathode ionization gauge of claim 1 wherein the second cathode comprises a feature directed toward the anode that establishes a narrow gap between the anode and feature to enable Paschen's Law discharge between the anode and the feature.

36. The cold cathode ionization gauge of claim 35 wherein the feature is displaced from the end of the second cathode adjacent to the first cathode.

37. A method of measuring pressure comprising:
applying a magnetic field to a first space between an anode and a first cathode;
at low pressures, releasing electrons into the first space to create a plasma discharge in the first space and ion flow to the first cathode;
at pressures higher than the low pressures, creating electric discharge between a second cathode and the anode to create a current flow to the second cathode; and
determining pressure based on measured current flow to the first cathode and on measured current flow to the second cathode.

38. A cold cathode ionization gauge comprising:
an anode;
a first cathode spaced from the anode by a first spacing sufficient to enable formation of a plasma between the anode and the first cathode and a resultant ion current flow into the first cathodes, a current flow response with respect to pressure of the first cathode having a first discontinuity;
a second cathode electrically isolated from the first cathode and spaced from the anode by second spacing less than the first spacing, the second spacing sufficient to enable formation of a plasma between the anode and the second cathode and a resultant ion current flow into the first cathode, a current flow response with respect to pressure of the second cathode having a second continuity;
a magnet applying a magnetic field through the first and second spacings to lengthen free electron paths to sustain the plasma;
an electric controller that applies voltage between the anode and each of the first and second cathodes to create ionization with plasma discharge between the anode and each of the first cathode and the second cathode, the controller determining pressure based on measured current flow to the first cathode through pressures that include the second discontinuity and determining pressure based on measured current flow to the second cathode through pressures that include the first discontinuity.

39. A method of measuring pressure comprising:
applying a magnetic field to a first space between an anode and a first cathode;
applying a magnetic field to a second space between the anode and a second cathode;
releasing electrons into the first space to create a plasma discharge in the first space and ion flow to the first cathode, a current flow response with respect pressure of the first cathode having a first discontinuity;
releasing electrons into the second space to create a plasma discharge in the second space and ion flow to the second cathode, a current flow response with respect to pressure of the second cathode having a second discontinuity;
determining pressure based on measured current flow to the first cathode and on measured current flow to the second cathode, pressure being based on measured current flow to the first cathode through pressures that include the second discontinuity and being based on measured current flow to the second cathode through pressures that include the first discontinuity.

40. A cold cathode ionization gauge comprising:
an anode;
a first cathode spaced from the anode by a first spacing sufficient to enable the formation of a plasma between the anode and the first cathode and the resultant ion current flow into the first cathode;
a second cathode electrically isolated from the first cathode and spaced from the anode by second spacing less than the first spacing sufficient to enable formation of a plasma between the anode and the second cathode and a resultant ion current flow into the second cathode;
a magnet applying a magnetic field through the first and second spacings to lengthen free electrons paths to sustain the plasma; and
an electric controller that applies voltage between the anode and each of the first and second cathodes to create ionization with plasma discharge between the anode and the first cathode and the second cathode over respective pressure ranges, the controller determining pressure based on measured current flow to the first cathode and on measured current flow to the second cathode.

41. The cold cathode ionization gauge of claim 40 wherein the controller determines first cathode impedance and second cathode impedance from the measured current flow to the first cathode, the measured current flow to the second cathode and measured anode voltage, and pressure is determined based on the first cathode impedance and the second cathode impedance.

* * * * *

UNITED STATES PATENT AND TRADEMARK OFFICE
CERTIFICATE OF CORRECTION

PATENT NO. : 10,337,940 B2
APPLICATION NO. : 15/499064
DATED : July 2, 2019
INVENTOR(S) : Timothy C. Swinney et al.

Page 1 of 1

It is certified that error appears in the above-identified patent and that said Letters Patent is hereby corrected as shown below:

In the Claims

In Claim 38, Column 18, Line 1 delete "first cathode" and insert --second cathode--.

In Claim 38, Column 18, Lines 2-3 delete "a second continuity" and insert --a second discontinuity--.

Signed and Sealed this
Twenty-first Day of April, 2020

Andrei Iancu
*Director of the United States Patent and Trademark Office*